(12) United States Patent
Dudar

(10) Patent No.: US 11,428,184 B1
(45) Date of Patent: Aug. 30, 2022

(54) METHOD AND SYSTEM FOR DIAGNOSING GRADE VENT VALVES

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/240,091

(22) Filed: Apr. 26, 2021

(51) Int. Cl.
*F02D 41/22* (2006.01)
*B60K 15/035* (2006.01)
*B60K 15/03* (2006.01)

(52) U.S. Cl.
CPC ...... *F02D 41/221* (2013.01); *B60K 15/03519* (2013.01); *B60K 2015/03217* (2013.01); *F02D 2041/224* (2013.01); *F02D 2200/702* (2013.01)

(58) Field of Classification Search
CPC .......... F02D 41/221; F02D 2041/224; F02D 2200/702; F02M 25/089; F02M 25/0818; F02M 25/0872; B60K 15/03519; B60K 2015/02117

See application file for complete search history.

(56) References Cited

U.S. PATENT DOCUMENTS

| | | | |
|---|---|---|---|
| 7,162,914 B2 | 1/2007 | Streib et al. | |
| 9,448,098 B2 | 9/2016 | Dudar et al. | |
| 10,717,344 B2 | 7/2020 | Strashny et al. | |
| 2005/0235968 A1* | 10/2005 | Pachciarz | F02M 25/089 123/519 |
| 2008/0135025 A1* | 6/2008 | Mc Lain | F02D 41/0035 123/520 |
| 2010/0162804 A1* | 7/2010 | Grunwald | F02M 25/0809 73/114.39 |
| 2017/0130680 A1* | 5/2017 | Dudar | F02M 25/0809 |
| 2017/0198662 A1* | 7/2017 | Dudar | F02M 25/0836 |
| 2019/0203668 A1 | 7/2019 | Dudar et al. | |
| 2020/0198461 A1* | 6/2020 | Dudar | B60K 15/03504 |

* cited by examiner

Primary Examiner — George C Jin
(74) Attorney, Agent, or Firm — Vincent Mastrogiacomo; McCoy Russell LLP

(57) ABSTRACT

Methods and systems are presented for diagnosing operation of passive grade vent valves of a fuel system. The methods and systems include adjusting a position of a vehicle so that fuel in a fuel tank may cause a first grade vent valve to open and a second grade vent valve to close.

19 Claims, 14 Drawing Sheets

METHOD AND SYSTEM FOR DIAGNOSING GRADE VENT VALVES

FIELD

The present description relates generally to methods and systems for diagnosing operation of passively operated fuel tank vent valves that may respond to grade of a road or surface.

BACKGROUND/SUMMARY

A vehicle may include a fuel tank for storing liquid fuel. The fuel tank may include one or more vents that allow fuel vapors to exit the fuel tank and air to enter the fuel tank. Some of the vent valves may respond to a grade that a vehicle is on to permit or restrict fuel vapors from exiting the fuel tank. For example, a vent valve may be normally configured to be in an open state to allow fuel vapors to exit a fuel tank. However, if the fuel tank is filled to a higher level with fuel and the vehicle is stopped or parked on a road or surface with a positive or negative grade, the vent valve may be closed by fuel acting on a float of the vent valve. Closing the vent valve may prevent fuel from exiting the fuel tank via the vent valve. Thus, it may be desirable to close the vent valve from time to time. Nevertheless, it may be possible for the vent valve to be held open when it is desirable for the vent valve to be closed. Alternatively, it may be possible for the vent valve to be held closed when it is desirable for the vent valve to be open. A vent valve that is held open may allow liquid fuel to migrate to a fuel vapor storage canister, thereby saturating the canister and reducing the canister's ability to trap fuel vapors. Conversely, a vent valve that is held closed may allow vacuum to develop within a fuel tank such that the vacuum may deform portions of the fuel tank. Therefore, it may be desirable to provide a way of determining whether or not fuel tank vent valves may be operating as desired.

The inventors herein have recognized the above-mentioned issue and have developed a method for diagnosing an evaporative emissions system, comprising: adjusting a position of a vehicle from a first position to a second position via a controller in response to an area of a fuel tank that is occupied via a fuel; and evaluating operation of a fuel tank vent valve while the vehicle is in the second position.

By adjusting a position of a vehicle, it may be possible to provide the technical result of diagnosing operation of passively controlled fuel tank vent valves. Specifically, a vehicle may be parked on a surface (e.g., a road or the earth) with a magnitude of grade (e.g., the absolute value of the grade) that is greater than a threshold so that fuel within the fuel tank may cause a grade vent valve (e.g., a vent valve that may open or close based on an amount of fuel that is stored in a fuel tank and grade of a surface that a vehicle is parked or stopped on) to close, thereby permitting diagnosis of operation of a second grade vent valve within the fuel tank. The area in a fuel tank that is occupied by fuel may change with a grade that the vehicle is parked on so that the passively operated grade vent valves may open or close depending on the grade of the surface that the vehicle is parked on. Fuel vapors may be prevented from flowing through a first grade vent valve while fuel vapors may be allowed to flow through a second grade vent valve so that operation of the second vent valve may be distinguished from operation of the first grade vent valve.

The present description may provide several advantages. In particular, the approach may allow vent valves that may respond to a grade of a surface that a vehicle is parked on to be individually diagnosed. Additionally, the approach may be implemented via a vehicle suspension system, an autonomous driver, or recognition of a vehicle's position. Further, the approach may reduce system cost by not having to provide position sensors to detect positions of grade vent valves.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
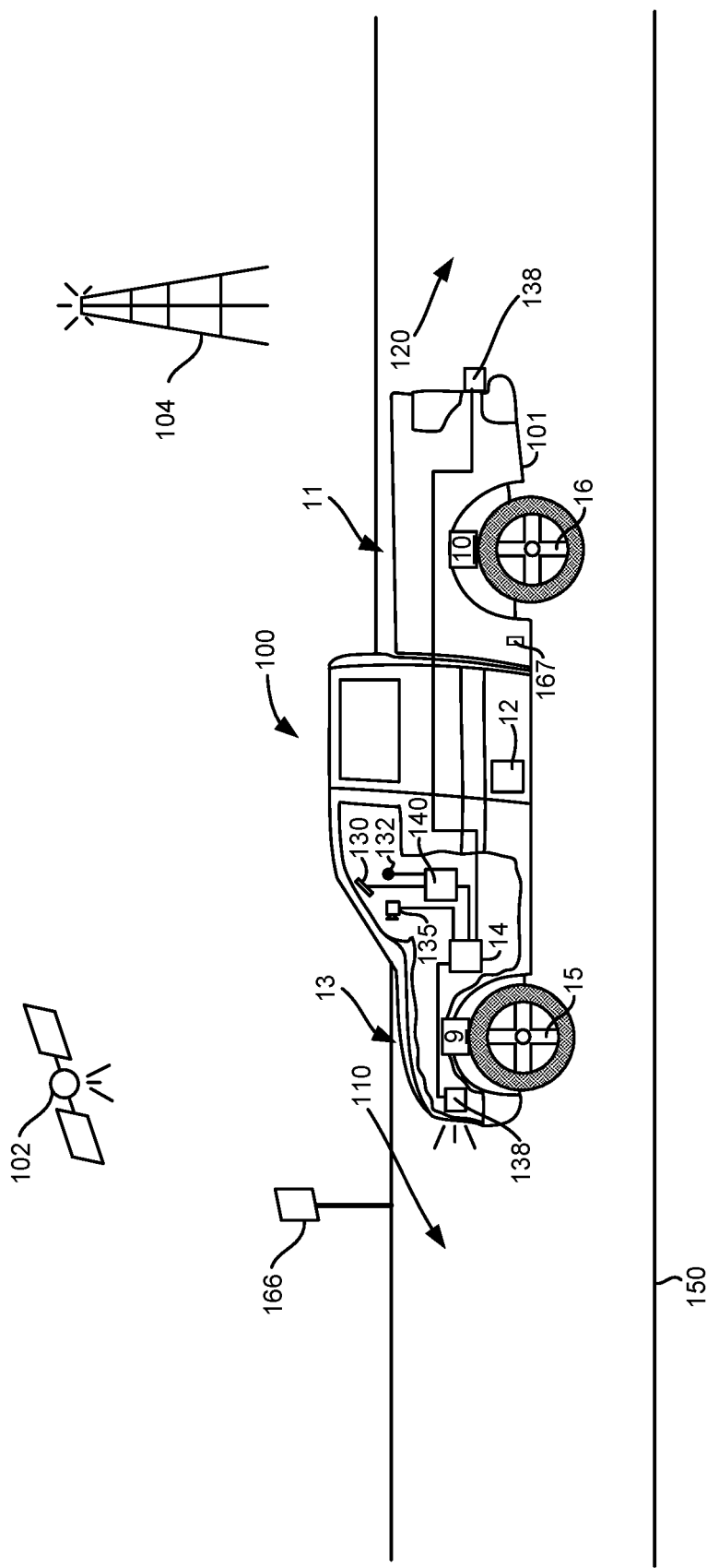
FIG. 1 shows an example vehicle that may be included in the systems and methods described herein.
Figure 2A:
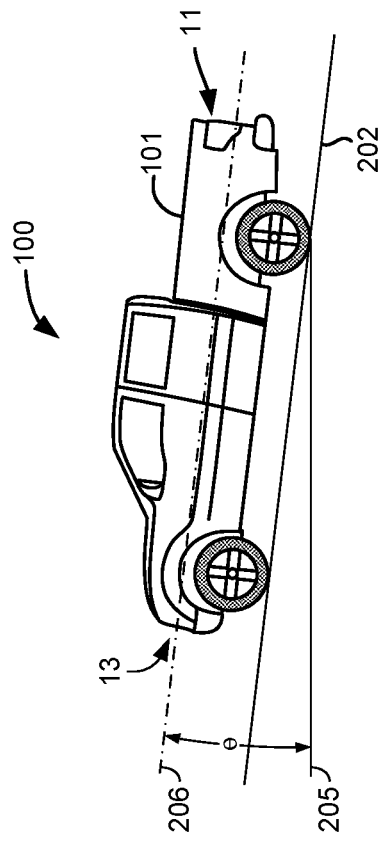
FIGS. 2A and 2B show two different orientations of a vehicle for diagnosing operation of grade vent valves.
Figure 2B:
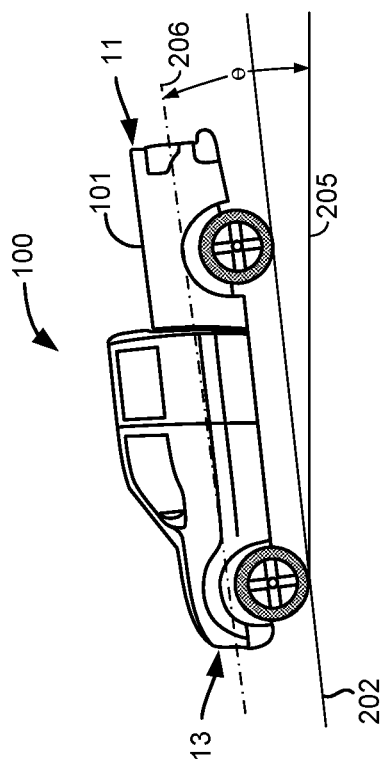
Figure 3:
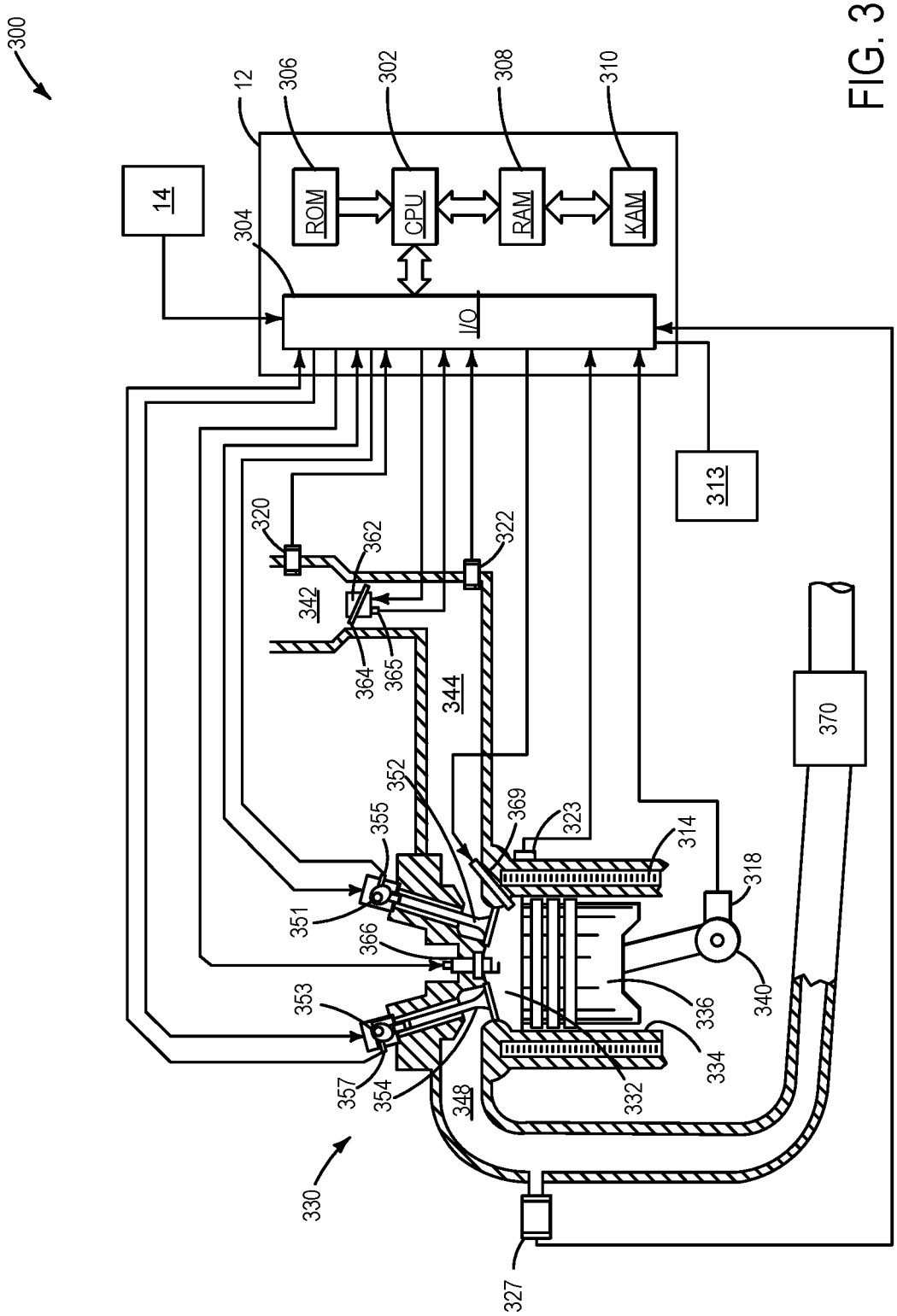
FIG. 3 shows an example internal combustion engine of a vehicle.
Figure 4:
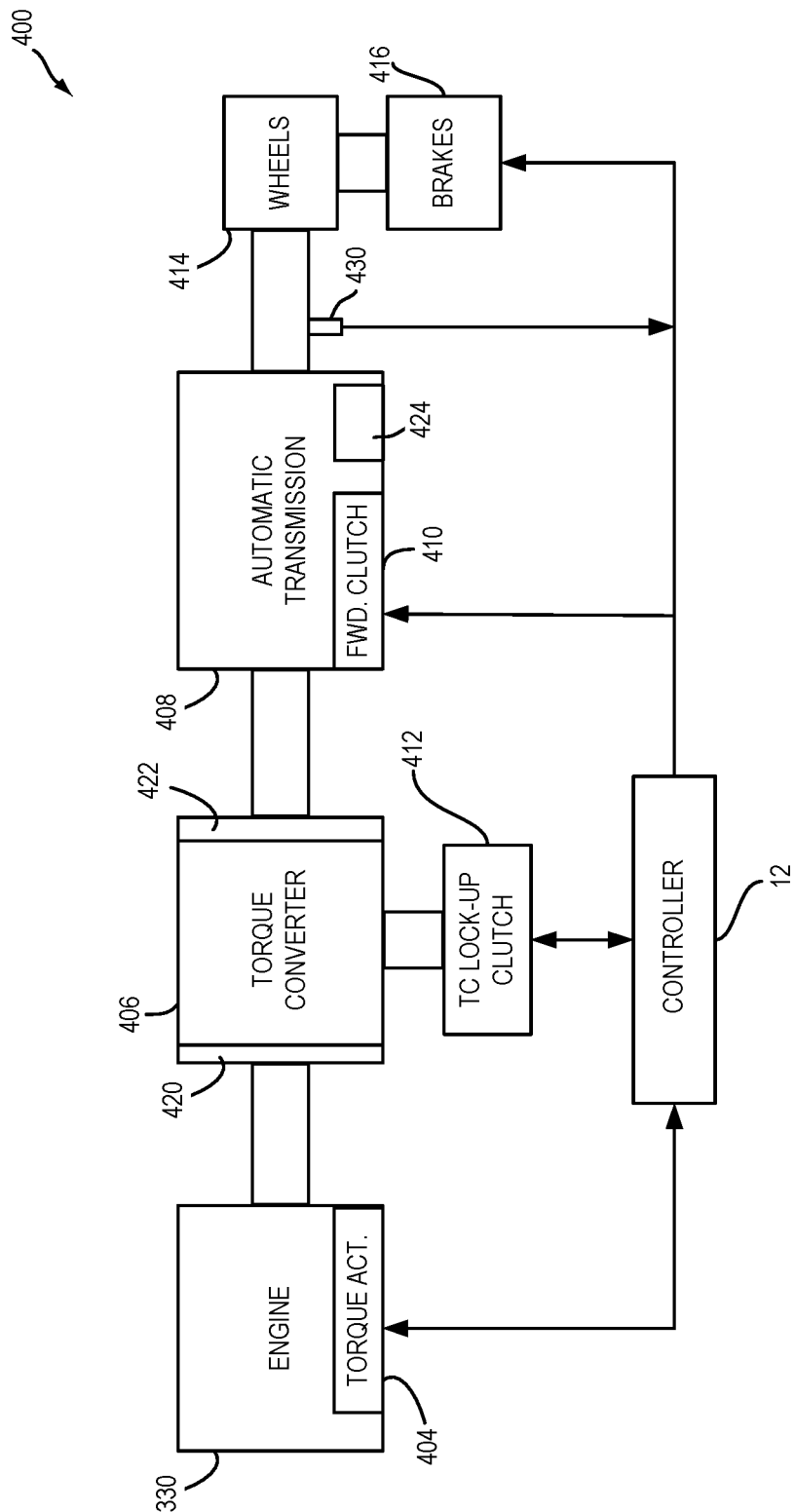
FIG. 4 shows an example powertrain of the vehicle that includes the engine.
Figure 5:
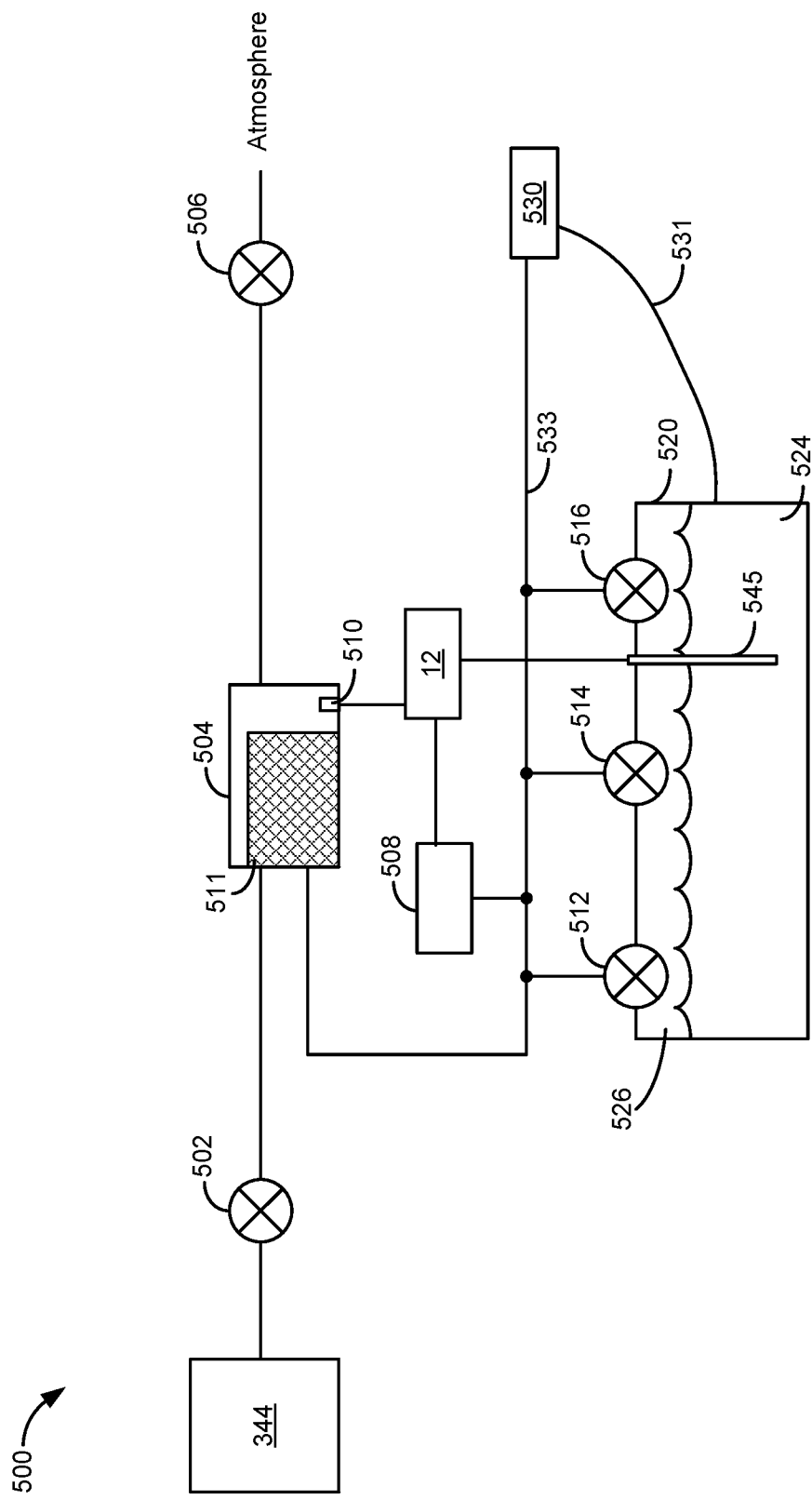
FIG. 5 shows a block diagram of an example evaporative emissions system for the vehicle.
Figure 6A:
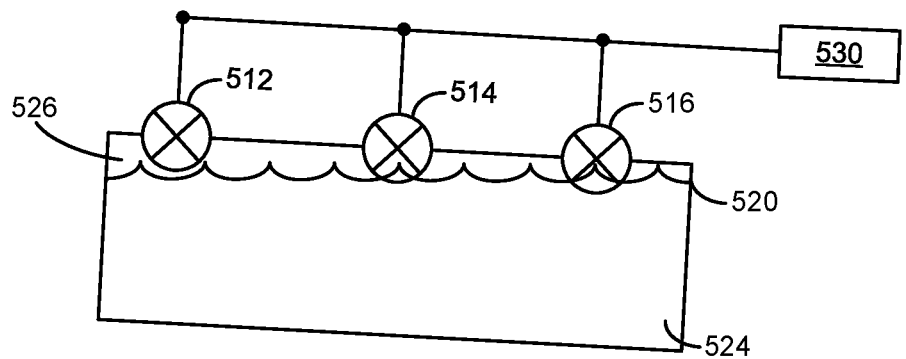
FIGS. 6A and 6B show example orientations of a fuel tank and vent valves when the vehicle is parked on a positive grade and a negative grade.
Figure 6B:
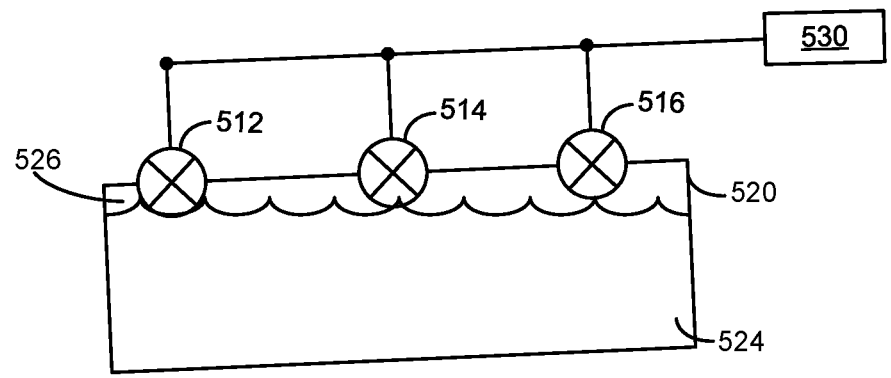

The following description relates to systems and methods for diagnosing operation of vent valves of a fuel tank in an evaporative emissions system of a vehicle. The vehicle may be an autonomous vehicle that travels on or off road as shown in FIG. 1. The vehicle may be parked with its front end directed downhill as shown in FIG. 2A or front uphill as shown in FIG. 2B as part of a process to diagnose fuel tank vent valves. The vehicle may include an engine and powertrain as shown in FIGS. 3 and 4. The vehicle may also include an evaporative emissions system as shown in FIG. 5. The vent valves may operate according to a level of fuel in the vehicle's fuel tank as shown in FIGS. 6A and 6B. The evaporative emissions system may be operated according to the sequence shown in FIG. 7 and the method of FIGS. 8-14. The method of FIGS. 8-14 may perform diagnostics on a fuel tank vent valve in an evaporative emissions system. The fuel tank vent valve diagnostic may ensure that fuel tank vent valves operate as intended so that fuel vapors may be captured and so that the fuel tank may not deform.

Referring now to FIG. 1, vehicle 100 includes one or more controllers (e.g., controller 12 and autonomous driver 14) for receiving sensor data and adjusting actuators. Controller 14 may operate vehicle 100 autonomously such that vehicle 100 steers, brakes, increases vehicle speed, decreases vehicle speed, obeys traffic signals and signs, and responds to its surrounding conditions without being driven via a human operator. In some examples, controller 14 may cooperate with additional controllers (e.g., controller 12) to operate vehicle 100. Vehicle 100 is shown with global positioning system (GPS) receiver 130. Satellite 102 provides time stamped information to GPS receiver 130 which relays the information to vehicle position determining system 140. Vehicle positioning determination system 140 relays road data (e.g., road grade, road type, speed limits, etc.) for road 150 to controller 14. Vehicle 100 may also be equipped with optional camera 135 for surveying road conditions in the path of vehicle 135. For example, camera 135 may acquire road conditions from road side signs 166 or displays. Vehicle position determining system 140 may alternatively acquire information for determining vehicle position from stationary broadcast tower 104 via receiver 132. In some examples, vehicle 100 may also include a sensor 138 for determining the proximity of vehicles and objects in the travel path of vehicle 100. Sensors 138 may sense positions and velocities of objects in front 110 of or behind 120 vehicle 100 via light (e.g., LASER), sound (e.g., SONAR), and/or radio waves (e.g., RADAR). Range and object data from sensors 138 may be provided to controllers 14 and 12. In addition, controllers 12 and 14 may communicate with each other and share data, limits, and control parameters.

A front end 13 of the chassis 101 of vehicle 100 may be raised or lowered with respect to a position of front wheels 15 via front chassis actuators 9 (e.g., air shocks, hydraulic shocks, electrical lift adjusters, etc.). A rear end 11 of the chassis 101 of vehicle 100 may be raised or lowered with respect to a position of rear wheels 16 via rear chassis actuators 10 (e.g., air shocks, hydraulic shocks, electrical lift adjusters, etc.). Grade data and/or vehicle chassis angular data may be provided via inclinometer 167 to controller 12 and autonomous driver 14.

Referring now to FIG. 2A, vehicle 100 is shown in a first orientation with front end 13 of chassis 101 directed downhill with respect to road 202. Rear end 11 of chassis 101 is elevated to a higher level than front end 13 so that fuel in a fuel tank (not shown) may act upon and close a first vent valve (not shown) that is located closer to front of vehicle 100 than a second vent valve (not shown) while the second vent valve (not shown) remains open. Angle θ is an angle between centerline 206 of vehicle 100 and a horizontal plane 205 of the earth.

Referring now to FIG. 2B, vehicle 100 is shown in a second orientation with front end 13 of chassis 101 directed uphill with respect to road 202. Rear end 11 of chassis 101 is lower than front 13 so that fuel in a fuel tank (not shown) may act upon and close a second vent valve (not shown) that is located closer to rear of vehicle 100 than the first vent valve (not shown) while the first vent valve (not shown) remains open. Angle θ is an angle between centerline 206 of vehicle 100 and a horizontal plane 205 of the earth.

The vehicle positions shown in FIGS. 2A and 2B may improve diagnostics for the vehicle's evaporative emissions system by allowing testing of a first vent valve to be decoupled from testing of a second vent valve. In addition, the vehicle positions shown in FIGS. 2A and 2B may provide for individually exercising the first vent valve and the second vent valve.

Referring now to FIG. 3, an example vehicle motive power source is shown. In this example, the vehicle motive power source is a spark ignition internal combustion engine. However, the vehicle motive power source may be a diesel engine, a turbine, or an electric machine.

FIG. 3 is schematic diagram showing one cylinder of a multi-cylinder engine 330 in an engine system 300 is shown. Engine 330 may be controlled at least partially by a control system including a controller 12 and by input from an autonomous driver or controller 14. Alternatively, a vehicle operator (not shown) may provide input via an input device, such as an engine torque, power, or air amount input pedal (not shown).

A combustion chamber 332 of the engine 330 may include a cylinder formed by cylinder walls 334 with a piston 336 positioned therein. The piston 336 may be coupled to a crankshaft 340 so that reciprocating motion of the piston is translated into rotational motion of the crankshaft. The crankshaft 340 may be coupled to at least one drive wheel of a vehicle via an intermediate transmission system. Further, a starter motor (not shown) may be coupled to the crankshaft 340 via a flywheel to enable a starting operation of the engine 330.

Combustion chamber 332 may receive intake air from an intake manifold 344 via an intake passage 342 and may exhaust combustion gases via an exhaust passage 348. The intake manifold 344 and the exhaust passage 348 can selectively communicate with the combustion chamber 332 via respective intake valve 352 and exhaust valve 354. In some examples, the combustion chamber 332 may include two or more intake valves and/or two or more exhaust valves.

In this example, the intake valve 352 and exhaust valve 354 may be controlled by cam actuation via respective cam actuation systems 351 and 353. The cam actuation systems 351 and 353 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 352 and exhaust valve 354 may be determined by position sensors 355 and 357, respectively. In alternative examples, the intake valve 352 and/or exhaust valve 354 may be controlled by electric valve actuation. For example, the cylinder 332 may alternatively include an intake valve controlled via electric valve actuation and an exhaust valve controlled via cam actuation including CPS and/or VCT systems.

A fuel injector 369 is shown coupled directly to combustion chamber 332 for injecting fuel directly therein in proportion to the pulse width of a signal received from the controller 12. In this manner, the fuel injector 369 provides what is known as direct injection of fuel into the combustion chamber 332. The fuel injector may be mounted in the side of the combustion chamber or in the top of the combustion chamber, for example. Fuel may be delivered to the fuel injector 369 by a fuel system (not shown) including a fuel tank, a fuel pump, and a fuel rail. In some examples, the combustion chamber 332 may alternatively or additionally include a fuel injector arranged in the intake manifold 344 in a configuration that provides what is known as port injection of fuel into the intake port upstream of the combustion chamber 332.

Spark is provided to combustion chamber 332 via spark plug 366. The ignition system may further comprise an ignition coil (not shown) for increasing voltage supplied to spark plug 366. In other examples, such as a diesel, spark plug 366 may be omitted.

The intake passage 342 may include a throttle 362 having a throttle plate 364. In this particular example, the position of throttle plate 364 may be varied by the controller 12 via a signal provided to an electric motor or actuator included with the throttle 362, a configuration that is commonly referred to as electronic throttle control (ETC). In this manner, the throttle 362 may be operated to vary the intake air provided to the combustion chamber 332 among other engine cylinders. The position of the throttle plate 364 may be provided to the controller 12 by a throttle position signal. The intake passage 342 may include a mass air flow sensor 320 and a manifold air pressure sensor 322 for sensing an amount of air entering engine 330.

An exhaust gas sensor 327 is shown coupled to the exhaust passage 348 upstream of an emission control device 370 according to a direction of exhaust flow. The sensor 327 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 327 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 370 is shown arranged along the exhaust passage 348 downstream of the exhaust gas sensor 327. The device 370 may be a three way catalyst (TWC), $NO_x$ trap, various other emission control devices, or combinations thereof. In some examples, during operation of the engine 330, the emission control device 370 may be periodically reset by operating at least one cylinder of the engine within a particular air-fuel ratio.

The controller 12 is shown in FIG. 3 as a microcomputer, including a microprocessor unit 302, input/output ports 304, an electronic storage medium for executable programs and calibration values shown as read only memory chip 306 (e.g., non-transitory memory) in this particular example, random access memory 308, keep alive memory 310, and a data bus. The controller 12 may receive various signals from sensors coupled to the engine 330, in addition to those signals previously discussed, including measurement of inducted mass air flow (MAF) from the mass air flow sensor 320; engine coolant temperature (ECT) from a temperature sensor 323 coupled to a cooling sleeve 314; an engine position signal from a Hall effect sensor 318 (or other type) sensing a position of crankshaft 340; throttle position from a throttle position sensor 365; and manifold absolute pressure (MAP) signal from the sensor 322. An engine speed signal may be generated by the controller 12 from crankshaft position sensor 318. Manifold pressure signal also provides an indication of vacuum, or pressure, in the intake manifold 344. Note that various combinations of the above sensors may be used, such as a MAF sensor without a MAP sensor, or vice versa. During engine operation, engine torque may be inferred from the output of MAP sensor 322 and engine speed. Further, this sensor, along with the detected engine speed, may be a basis for estimating charge (including air) inducted into the cylinder. In one example, the crankshaft position sensor 318, which is also used as an engine speed sensor, may produce a predetermined number of equally spaced pulses every revolution of the crankshaft.

The storage medium read-only memory 306 can be programmed with computer readable data representing non-transitory instructions executable by the processor 302 for performing at least portions of the methods described below as well as other variants that are anticipated but not specifically listed. Thus, controller 12 may operate actuators to change operation of engine 330. In addition, controller 12 may post data, messages, and status information to human/machine interface 313 (e.g., a touch screen display, heads-up display, light, etc.).

During operation, each cylinder within engine 330 typically undergoes a four stroke cycle: the cycle includes the intake stroke, compression stroke, expansion stroke, and exhaust stroke. During the intake stroke, generally, the exhaust valve 354 closes and intake valve 352 opens. Air is introduced into combustion chamber 332 via intake manifold 344, and piston 336 moves to the bottom of the cylinder so as to increase the volume within combustion chamber 332. The position at which piston 336 is near the bottom of the cylinder and at the end of its stroke (e.g. when combustion chamber 332 is at its largest volume) is typically referred to by those of skill in the art as bottom dead center (BDC).

During the compression stroke, intake valve 352 and exhaust valve 354 are closed. Piston 336 moves toward the cylinder head so as to compress the air within combustion chamber 332. The point at which piston 336 is at the end of its stroke and closest to the cylinder head (e.g. when combustion chamber 332 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 366, resulting in combustion.

During the expansion stroke, the expanding gases push piston 336 back to BDC. Crankshaft 340 converts piston movement into a rotational torque of the rotary shaft. Finally, during the exhaust stroke, the exhaust valve 354 opens to release the combusted air-fuel mixture to exhaust manifold 348 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 3 shows only one cylinder of a multi-cylinder engine, and each cylinder may similarly include its own set of intake/exhaust valves, fuel injector, spark plug, etc.

Referring now to FIG. 4, a schematic of a vehicle drive-train 400 is shown. Drive-train 400 may be powered by engine 330 as shown in greater detail in FIG. 3. In one example, engine 330 may be a gasoline engine. In alternate examples, other engine configurations may be employed, for example, a diesel engine. Engine 330 may be started with an engine starting system (not shown). Further, engine 330 may generate or adjust torque via torque actuator 404, such as a fuel injector, throttle, cam, etc.

An engine output torque may be transmitted to torque converter 406 to drive a step-ratio automatic transmission 408 by engaging one or more clutches, including forward clutch 410, where the torque converter may be referred to as a component of the transmission. Torque converter 406 includes an impeller 420 that transmits torque to turbine 422 via hydraulic fluid. One or more gear clutches 424 may be engaged to change gear ratios between engine 330 and vehicle wheels 414. The output of the torque converter 406 may in turn be controlled by torque converter lock-up clutch 412. As such, when torque converter lock-up clutch 412 is fully disengaged, torque converter 406 transmits torque to automatic transmission 408 via fluid transfer between the torque converter turbine 422 and torque converter impeller 420, thereby enabling torque multiplication. In contrast, when torque converter lock-up clutch 412 is fully engaged, the engine output torque is directly transferred via the torque converter clutch 412 to an input shaft of transmission 408. Alternatively, the torque converter lock-up clutch 412 may be partially engaged, thereby enabling the amount of torque relayed to the transmission to be adjusted. A controller 12 may be configured to adjust the amount of torque transmitted by the torque converter by adjusting the torque converter lock-up clutch in response to various engine operating conditions, or based on a driver-based engine operation request.

Torque output from the automatic transmission 408 may in turn be transferred to wheels 414 to propel the vehicle. Specifically, automatic transmission 408 may adjust an input driving torque at the input shaft (not shown) responsive to a vehicle traveling condition before transmitting an output driving torque to the wheels. Vehicle speed may be determined via speed sensor 430.

Further, wheels 414 may be locked by engaging wheel brakes 416. In one example, wheel brakes 416 may be engaged in response to the driver pressing his foot on a brake pedal (not shown). In the similar way, wheels 414 may be unlocked by disengaging wheel brakes 416 in response to the driver releasing his foot from the brake pedal.

Referring now to FIG. 5, a block diagram of an example evaporative emissions system 500 is shown. Evaporative emissions system 500 includes a canister purge valve 502, a carbon filled canister 504, a canister vent valve 506, a fuel tank pressure sensor 508, a carbon canister temperature sensor 510, a fuel tank cap 530, a first vent valve 512, a second vent valve 516, and a fuel limit vent valve 514. Carbon filled canister 504 may include activated carbon 511 to store fuel vapors. First vent valve 512 and second vent valve 516 may also be described as first grade vent valve 512 and second grade vent valve 516. The first vent valve 512, the fuel limit valve, and the second vent valve may be fluidically coupled to the carbon containing canister 504 via a conduit 533.

Fuel tank 526 and first vent valve 512 may be arranged in vehicle 100 closer to a front end 13 of a vehicle 100 than second vent valve 516. Further, second vent valve 516 may be arranged in vehicle 100 closer to rear end 11 of vehicle 100 than first vent valve 512. Canister purge valve 502 may selectively provide fluidic communication between carbon canister 504 and intake manifold 344. Canister vent valve 506 may selectively provide fluidic communication between carbon canister 504 and atmosphere.

Fuel 524 in fuel tank 520 may generate vapors that migrate to vapor space 526 within fuel tank 520 when fuel 524 is exposed to warm temperatures and agitation. Fuel vapors may migrate from vapor space 526 toward atmosphere when either or both of vent valves 512 and 516 are closed. Fuel limit vent valve 514 may close during filling of fuel tank 520 to prevent overfilling of fuel tank 520. Fuel may flow from fuel cap 530 to fuel tank 520 via filler neck pipe 531. Fuel level sensor 545 may provide an indication of a fuel level in fuel tank 520.

Referring now to FIGS. 6A and 6B, schematic diagrams illustrating ways that passive vent valves may be exercised to change operating state are shown. FIG. 6A shows a way to change a state of a second fuel tank vent valve 516 that is positioned closer to a rear of a vehicle than a first fuel tank vent valve 512 while maintaining a state of a first fuel tank vent valve 512 that is positioned closer to a front of a vehicle than the second fuel tank vent valve 516. FIG. 6B shows a way to change a state of a first fuel tank vent valve 512 that is positioned closer to a front of a vehicle than a second fuel tank vent valve 516 while maintaining a state of a second fuel tank vent valve 516 that is positioned closer to a rear of a vehicle than the first fuel tank vent valve 512.

FIG. 6A shows a position of fuel tank 520 when a vehicle in which the fuel tank resides is parked with its front pointed uphill. Parking the vehicle in this way causes fuel 524 in the tank to seek a lowest level in the tank. The fuel 524 moves such that it touches second fuel tank vent valve 516 and it causes second fuel tank vent valve 516 to close such that it does not allow communication between fuel tank 520 and carbon filled canister 530 via the second fuel tank vent valve 516. Thus, fuel 520 is biased toward the downhill side of fuel tank 520 due to gravitational force. First vent valve 512 remains in an open state and it allows fluidic communication between fuel tank 520 and carbon filled canister 530. Thus, parking the vehicle with its front end directed uphill and higher than the vehicle's rear end may allow the second fuel tank vent valve 516 to be closed due to at least partially submerging the second fuel tank vent valve 516 in fuel. Therefore, if the second vent valve is operating properly, fuel vapors may enter carbon filled canister only via the first vent valve 512. A temperature within the carbon filled canister 530 may increase when a level of fuel vapors are being stored within the carbon filled canister is increasing. However, if the second fuel tank vent valve 516 does not close, liquid fuel may migrate to the carbon filled canister 530, which may reduce a temperature within the carbon filled canister 530.

FIG. 6B shows a position of fuel tank 520 when a vehicle in which the fuel tank resides is parked with its front pointed downhill. Parking the vehicle in this way causes fuel 524 in the tank to seek a lowest level in the tank. The fuel 524 moves such that it touches first fuel tank vent valve 512 and it causes first fuel tank vent valve 512 to close such that it does not allow communication between fuel tank 520 and carbon filled canister 530 via the first fuel tank vent valve 512. Thus, fuel 520 is biased toward the downhill side of fuel tank 520 due to gravitational force. Second vent valve 516 remains in an open state and it allows fluidic communication between fuel tank 520 and carbon filled canister 530. Thus, parking the vehicle with its front end directed downhill and lower than the vehicle's rear may allow the first fuel tank vent valve 512 to be closed due to at least partially submerging the first fuel tank vent valve 512 in fuel. Therefore, if the first vent valve 512 is operating properly, fuel vapors may enter carbon filled canister only via the second vent valve 516. A temperature within the carbon filled canister 530 may increase when a level of fuel vapors are being stored within the carbon filled canister is increasing. However, if the first fuel tank vent valve 512 does not close, liquid fuel may migrate to the carbon filled canister 530, which may reduce a temperature within the carbon filled canister 530.

In this way, fuel tank 520 may be oriented such that a fuel level in the fuel tank biases fuel toward closing the first vent valve 512 when a front of a vehicle is directed downhill. This allows first vent valve 512 to be lower than second vent valve 516 relative to the center of the earth. Further, fuel tank 520 may be oriented such that a fuel level in the fuel tank biases fuel toward closing the second vent valve 516 while the first vent valve 512 is open when a front of a vehicle is directed uphill. This allows second vent valve 516 to be lower than first vent valve 512 relative to the center of the earth.

Thus, the system of FIGS. 1-6B provides for a vehicle system, comprising: a vehicle including an internal combustion engine and a fuel tank, the fuel tank including at least one vent valve; and one or more controllers in the vehicle, the one or more controllers including executable instructions stored in non-transitory memory that cause the one or more controllers to evaluate operation of a vent valve in response to an area in a fuel tank that is occupied by a fuel, or in another representation, in response to a request to diagnose fuel tank vent valve operation. The vehicle system includes where the area of the tank is inferred from an inclination of the vehicle and a fuel level sensor. The vehicle system further comprises additional instructions to change a position of the vehicle to change the area in the fuel tank that is occupied by the fuel. The vehicle system includes where changing the position of the vehicle includes stopping the vehicle on a surface having a grade with a magnitude that is greater than a threshold. The vehicle system further comprises additional instructions to determine an operating state of the vent valve in response to a temperature of a carbon filled canister. The vehicle system further comprises additional instructions to indicate that the vent valve is degraded or not degraded according to the operating state. The vehicle system further comprises additional instructions to adjust a travel route of the vehicle in response to whether or not the vent valve is degraded.

Figure 7:
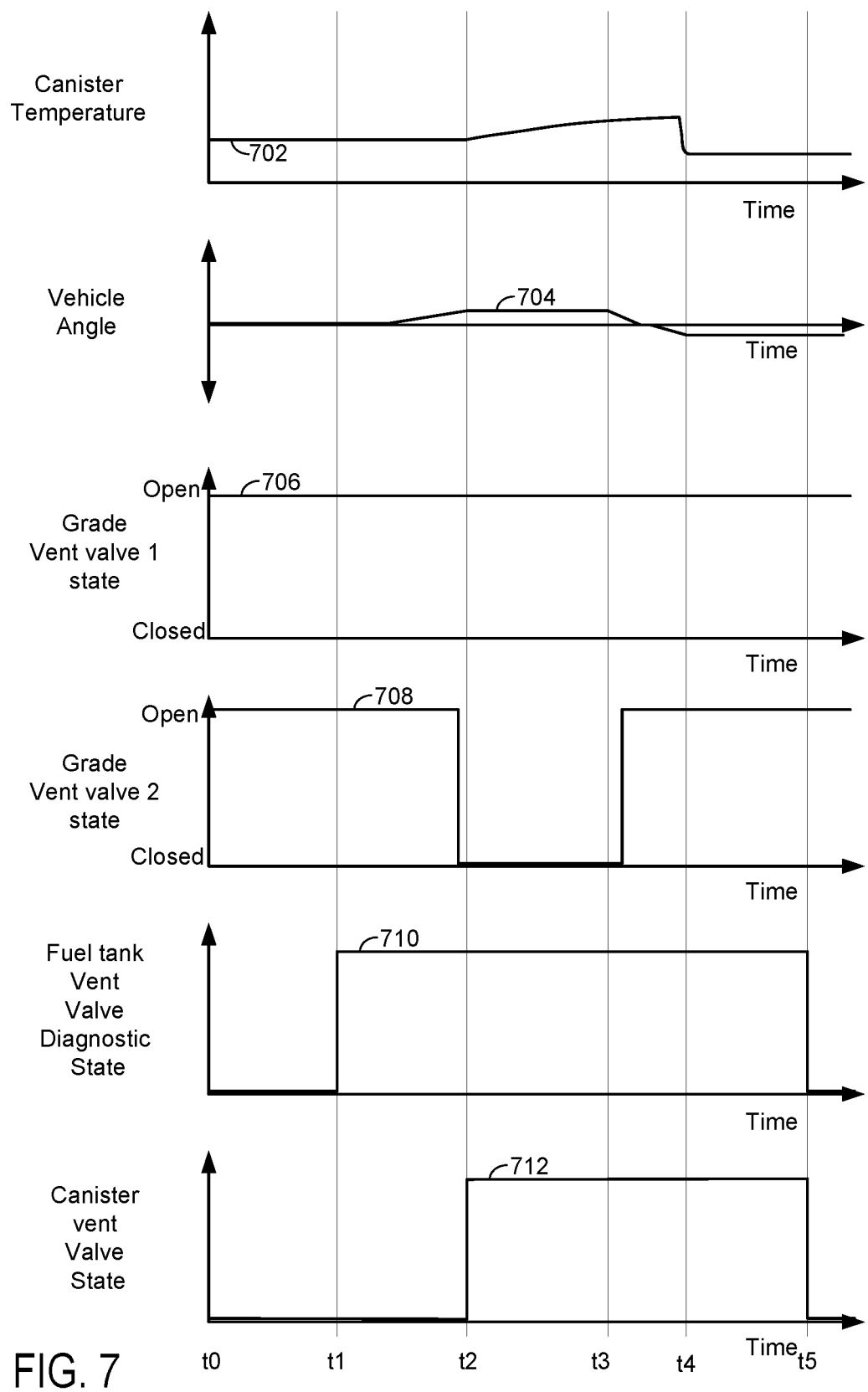
FIG. 7 shows an example evaporative emission system operating sequence according to the method of FIGS. 8-14.
Figure 8:
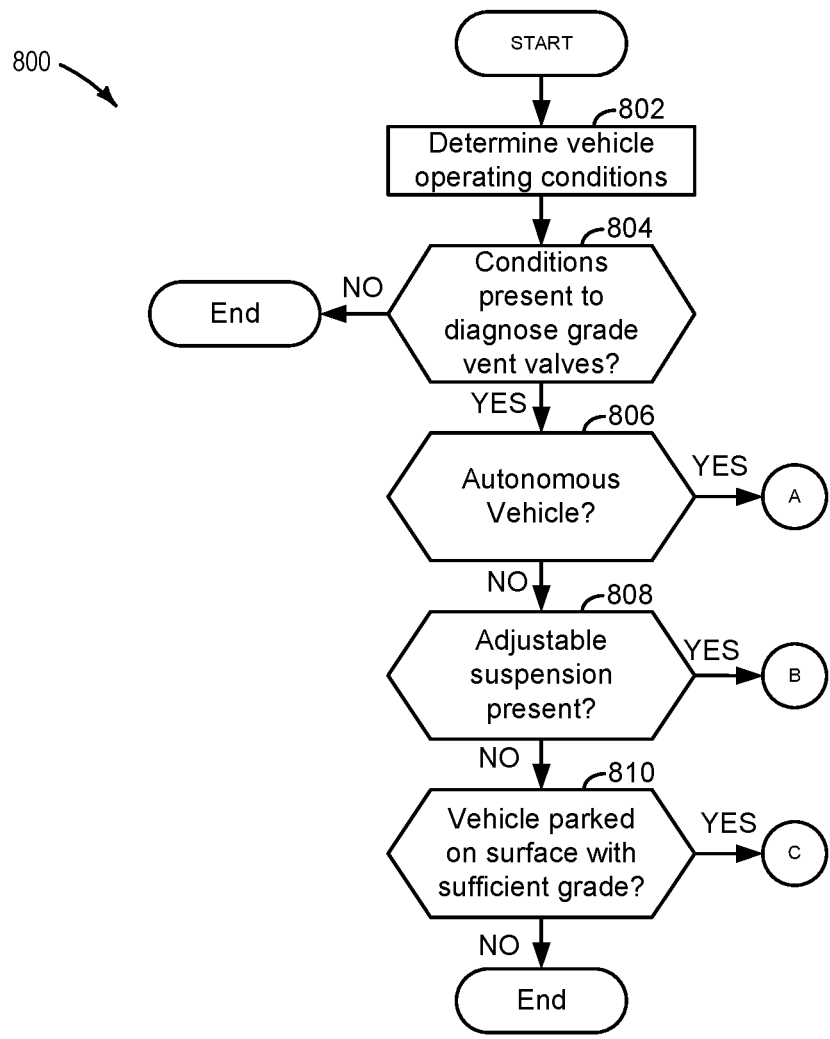
FIGS. 8-14 show an example method for operating an evaporative emissions system.
Figure 9:
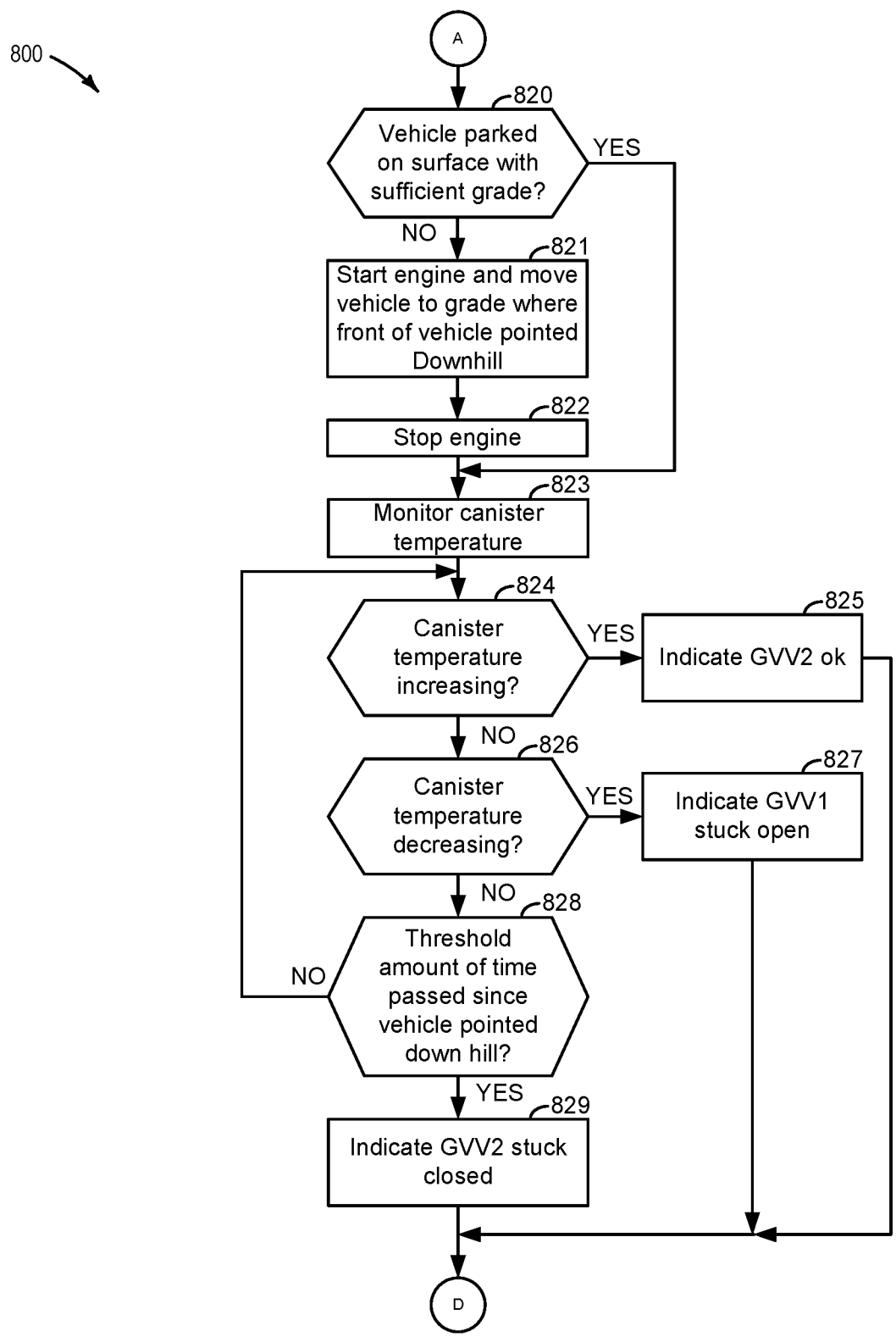
Figure 10:
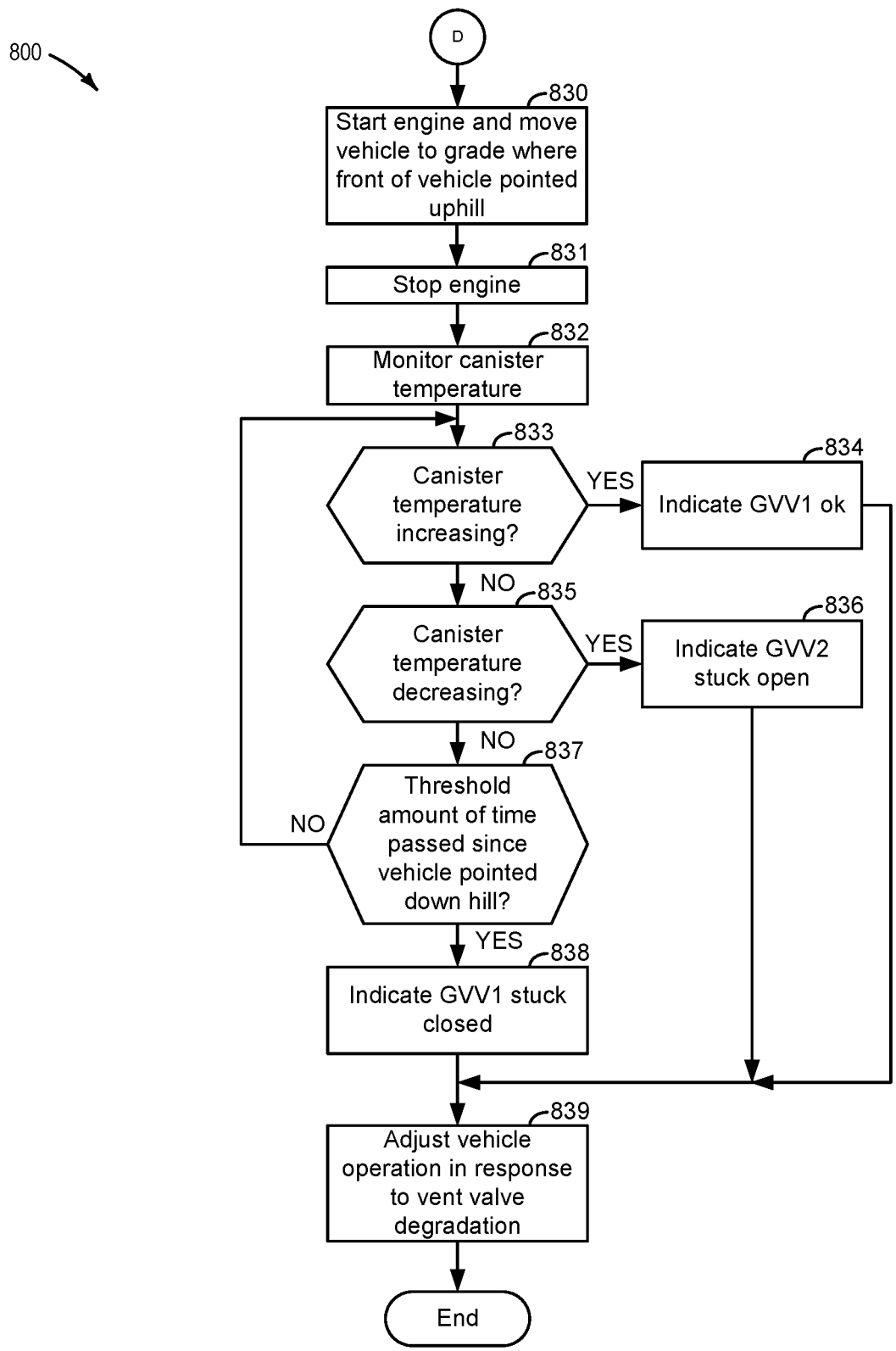
Figure 11:
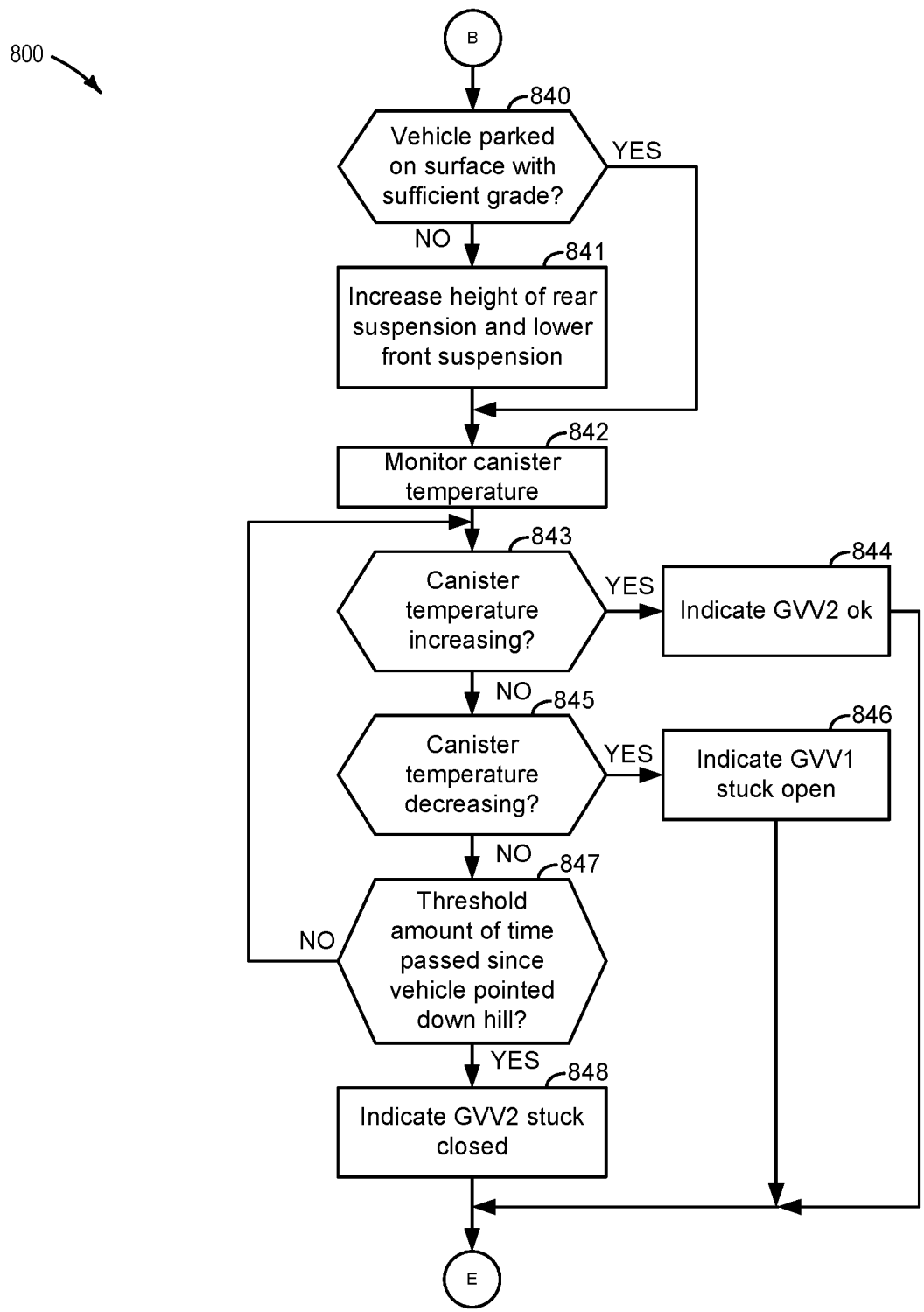
Figure 12:
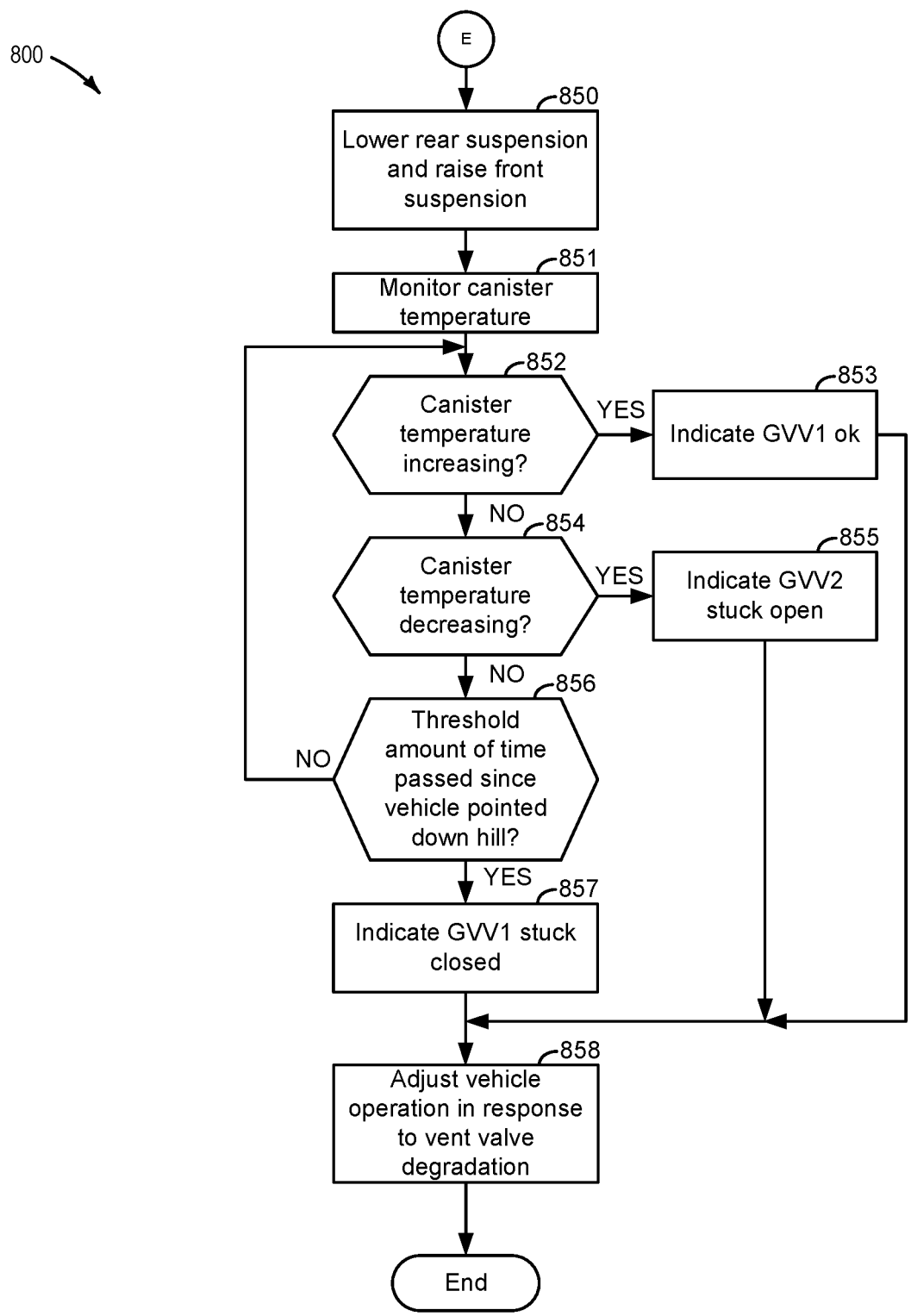
Figure 13:
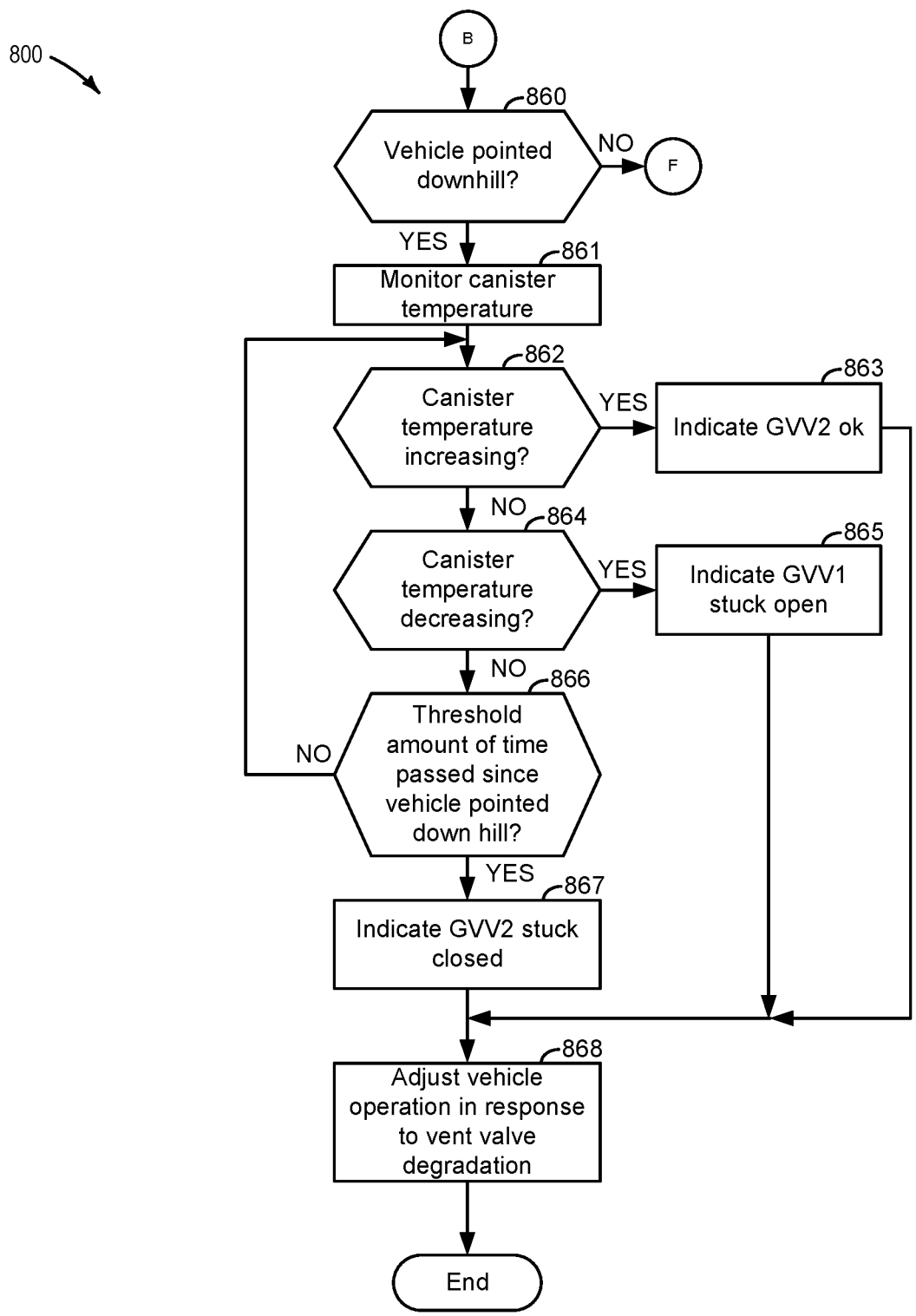
Figure 14:
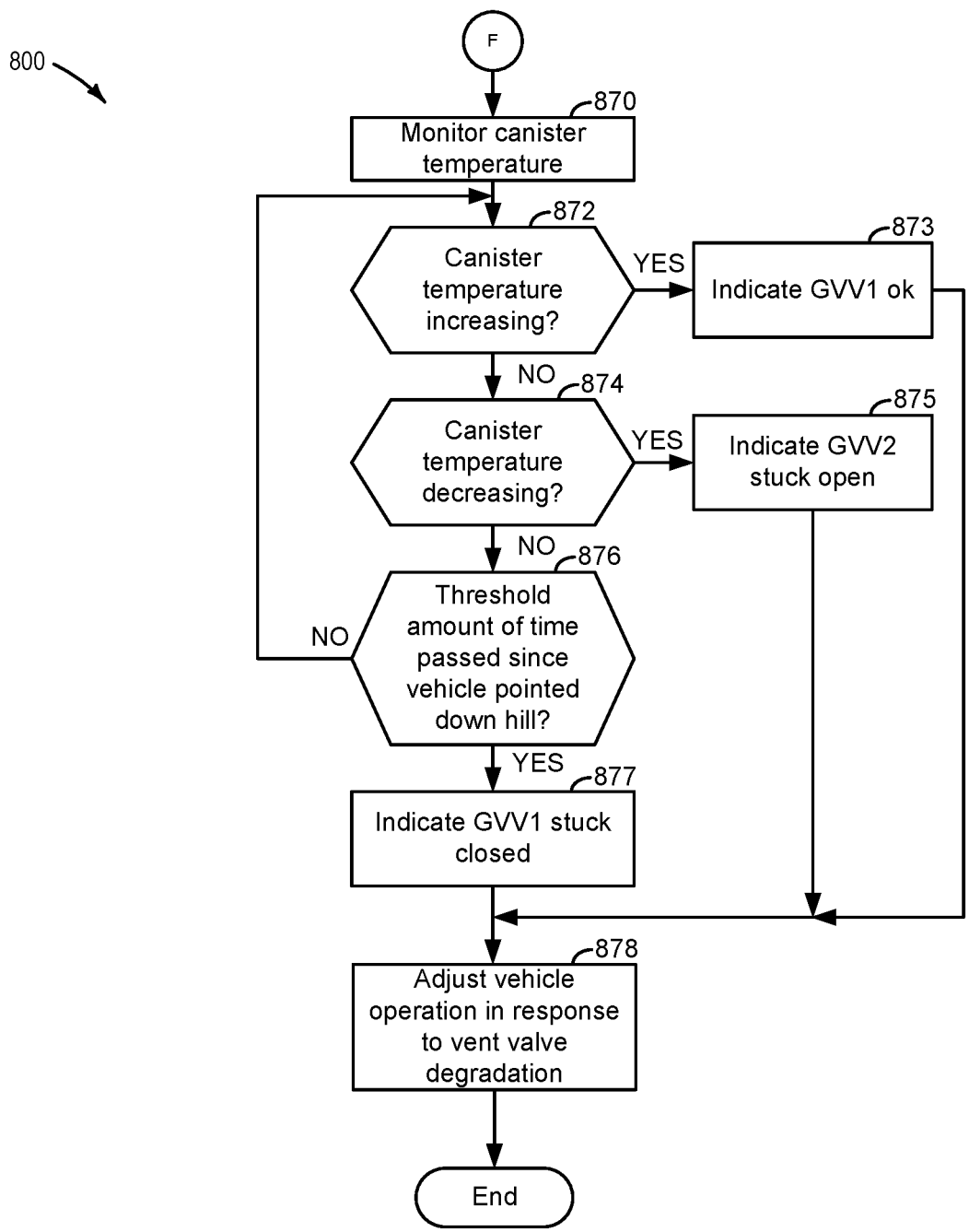

Referring now to FIG. 7, an example sequence for diagnosing operation of fuel tank vent valves is shown. The sequence of FIG. 7 may be provided by the system of FIGS. 1-6B in cooperation with the method of FIGS. 8-14. Vertical markers at times t0-t5 represent times of interest during the sequence. All of the plots occur at a same time and same vehicle operating conditions.

The first plot from the top of FIG. 7 is a plot of a temperature within a carbon filled canister that is coupled to fuel tank vent valve 1 and fuel tank vent valve 2. The vertical axis represents the temperature in the carbon filled canister and the temperature increases in the direction of the vertical axis arrow. The horizontal axis represents time and time increases from the left side of the plot to the right side of the plot. Trace 702 represents the temperature in the carbon filled canister.

The second plot from the top of FIG. 7 is a plot of a vehicle chassis angle (e.g., an angle between a longitudinal axis of the vehicle and a horizontal axis of the earth at the location of the vehicle), which may be equivalent to a grade of a road or surface that the vehicle is stopped on. Positive values indicate that the vehicle's front end is directed uphill. Negative values indicate that the vehicle's front end is directed downhill. The vertical axis represents the vehicle angle and the vehicle angle is positive above the horizontal axis and it increases in the direction of the vertical axis arrow. The vehicle angle is negative below the horizontal axis and the magnitude of the vehicle angle increases in the direction of the arrow that is directed toward the bottom of the figure. The horizontal axis represents time and time increases from the left side of the plot to the right side of the plot. Trace 704 represents the vehicle chassis angle.

The third plot from the top of FIG. 7 is a plot of an operating state of a first fuel tank vent valve or a first grade vent valve (e.g., 512 in FIG. 5) versus time. The vertical axis represents the operating state of the first fuel tank vent valve. The horizontal axis represents time and time increases from the left side of the plot to the right side of the plot. The first vent valve is closed when trace 706 is at a lower level near the horizontal axis. The first vent valve is open when trace 706 it at a higher level near the vertical axis arrow. Trace 706 represents the state of the first fuel tank vent valve.

The fourth plot from the top of FIG. 7 is a plot of an operating state of a second fuel tank vent valve or a second grade vent valve (e.g., 516 in FIG. 5) versus time. The vertical axis represents the operating state of the second fuel tank vent valve. The horizontal axis represents time and time increases from the left side of the plot to the right side of the plot. The second vent valve is closed when trace 708 is at a lower level near the horizontal axis. The second vent valve is open when trace 708 it at a higher level near the vertical axis arrow. Trace 708 represents the state of the second fuel tank vent valve.

The fifth plot from the top of FIG. 7 is a plot of a state of a fuel tank vent valve diagnostic versus time. The vertical axis represents the state of the fuel tank vent valve diagnostic. The horizontal axis represents time and time increases from the left side of the plot to the right side of the plot. The fuel tank vent valve diagnostic is not being performed when trace 710 is at a lower level near the horizontal axis. The fuel tank vent valve diagnostic is being performed when trace 710 is at a higher level near the vertical axis arrow. Trace 710 represents the fuel tank vent valve diagnostic state level.

The sixth plot from the top of FIG. 7 is a plot of a state of a carbon canister vent valve versus time. The vertical axis represents the state of the carbon canister vent valve state. The horizontal axis represents time and time increases from the left side of the plot to the right side of the plot. The carbon canister vent valve is not open when trace 712 is at a lower level near the horizontal axis. The carbon canister vent valve is open when trace 712 is at a higher level near the vertical axis arrow. Trace 712 represents the carbon canister vent valve state.

At time t0, the temperature in the carbon filled canister is at a middle level and the vehicle angle is zero. The first and second vent valves are open but vapors do not flow to the carbon canister since the carbon canister vent valve (e.g., 506 of FIG. 5) is closed. The fuel tank vent valve diagnostic has not started.

At time t1, conditions for a fuel tank vent valve diagnostic are present and so the fuel tank vent valve diagnostic begins. The first and second fuel tank vent valves (e.g., 512 and 516 of FIG. 5) are open and the vehicle angle is zero. The vehicle's autonomous driver (not shown) begins to change a position of the vehicle that includes the fuel tank vent valves so that the fuel tank vent valves may be exercised to change their operating states. The canister vent valve remains closed so that fuel vapors may not flow from the fuel tank to the carbon filled canister.

Between time t1 and time t2, the second fuel tank vent valve closes in response to fuel reaching a level of the second fuel tank vent valve. The temperature in the carbon filled canister is unchanged and the angle of the vehicle continues to increase. The first fuel tank vent valve remains open. The canister vent valve remains closed.

At time t2, the vehicle is stopped on an incline by the autonomous driver with the vehicle's front end directed or pointing uphill (not shown). The fuel in the fuel tank settles at the rear side of the fuel tank so as to keep the second fuel tank vent valve closed since the vehicle is parked on an incline. The first fuel tank vent valve remains open and the canister vent valve is opened to allow fuel vapors to flow from the fuel tank to the charcoal filled canister where fuel vapors may be stored such that air flows through the canister vent valve and to atmosphere. The temperature in the carbon filled canister begins to increase since hydrocarbons are being stored in the carbon filled canister. The temperature in the carbon filled canister continues to increase between time t2 and time t3. A controller may infer that the first fuel tank vent valve is open as expected since the temperature in the carbon filled canister increases as may be expected.

At time t3, the autonomous driver begins to move the vehicle so as to urge the first and second fuel tank vent valves to change operating state. In particular, the autonomous driver begins to move the vehicle such that the front of the vehicle may be directed to or pointing downhill. The canister vent valve remains open and the fuel tank vent valve diagnostic continues.

Shortly after time t3, the second fuel tank vent valve opens when fuel in the fuel tank moves due to the vehicle's orientation such that the second fuel tank vent valve is no longer partially submerged in fuel within the fuel tank. The temperature within the carbon filled canister continues to increase as hydrocarbons continue to be stored in the carbon filled canister. The first fuel tank vent valve remains open between time t3 and time t4.

At time t4, the vehicle stops on an incline such that the vehicle's front is directed to or pointing downhill. The first fuel tank vent valve remains open at a time when it is expected to closed due to the level of fuel in the tank and the vehicles orientation while parked on a grade. Consequently, liquid fuel may flow to the carbon filled canister causing a reduction in the temperature within the carbon filled canister. The second fuel tank vent valve is also open since it is not closed by fuel in the fuel tank with the vehicle parked on the present surface having a grade with a magnitude that is greater than a threshold. The fuel tank vent valve diagnostic continues and the canister vent valve remains open. A controller may infer that the first fuel tank vent valve is degraded since the temperature in the canister has decreased. The temperature decrease may be due to fuel flowing from the first fuel tank vent valve to the carbon filled canister. As such, the controller may indicate that the first fuel tank vent valve is degraded because it has not closed when it may be expected to close. The fuel tank vent valve diagnostic is completed at time t5. The canister vent valve is closed at time t5.

In this way, a vehicle's front end may be pointed uphill and then downhill to diagnose whether or not a first fuel tank vent valve and a second fuel tank vent valve are operating as may be expected. The vehicle may be moved by an autonomous driver so that humans need not be disturbed to diagnose the fuel tank vent valves.

Referring now to FIGS. 8-14, an example method 800 for diagnosing operation and status of fuel tank vent valves is shown. At least portions of method 800 may be included in and cooperate with a system as shown in FIGS. 1-6B as executable instructions stored in non-transitory memory. The method of FIGS. 8-14 may cause the controller to actuate the actuators in the real world and receive data and signals from sensors described herein when the method is realized as executable instructions stored in controller memory.

At 802, method 800 determines vehicle operating conditions. Vehicle operating conditions may include but are not limited to a total distance travelled by the vehicle, engine temperature, ambient temperature, vehicle speed, a fuel level in a fuel tank, vehicle position, an amount of fuel vapor stored in a carbon filled canister, and engine state (e.g., on/off). Method 800 proceeds to 804.

At 804, method 800 judges if conditions are present for diagnosing fuel tank vent valves or grade vent valves. In one example, method 800 may judge that conditions are present for diagnosing fuel tank vent valves if a level of fuel in a fuel tank is greater than a threshold, the vehicle's engine is stopped (e.g., not rotating and combusting fuel), and the vehicle is parked. Method 800 may also require that additional conditions be met for fuel tank vent valve diagnostics to begin. For example, method 800 may require that the vehicle is unoccupied and not assigned on an errand or task. If method 800 judges that conditions are present for diagnosing fuel tank vent valves, the answer is yes and method 800 proceeds to 806. Otherwise, the answer is no and method 800 exits.

Method 800 judges if the vehicle that includes the fuel tank vent valves is an autonomous vehicle at 806. In one example, a variable stored in controller memory may indicate if the vehicle is an autonomous vehicle. For example, if the value of the variable is one the vehicle is an autonomous vehicle. However, if the value of the variable is zero the vehicle is not an autonomous vehicle. If method 800 judges that the vehicle is an autonomous vehicle, the answer is yes and method 800 proceeds to 820. Otherwise, the answer is no and method 800 proceeds to 808.

At 820, method 800 judges if the vehicle is parked on a surface (e.g., a road) with sufficient grade (e.g., greater than 3% or less than −3%) to perform a fuel tank vent valve diagnostic and if the front end of the vehicle is directed or pointing uphill or downhill (e.g., the front wheels are above or below the rear wheels). In one example, method 800 may determine the surface grade via a GPS system or an inclinometer. The grade and the amount of fuel may allow the controller to estimate what portion or area of the fuel tank is occupied with fuel and what section or area of the fuel tank is not occupied with fuel. Further, opening and closing of the vent valves may be inferred by estimating what portions or areas of the fuel tank are filled with fuel. In one example, fuel level and road grade or vehicle chassis angle may reference a table that outputs indications of which fuel tank vent valves are expected to be open and which fuel tank vent valves are expected to be closed. If method 800 judges that the vehicle is parked on a surface with sufficient grade to perform the fuel tank vent valve diagnostic, the answer is yes and method 800 proceeds to 823. If method 800 judges that the vehicle is not parked on a surface with sufficient grade to perform the fuel tank vent valve diagnostic, the answer is no and method 800 proceeds to 821. Alternatively, if a first and a second fuel tank vent valves are expected to be open, the answer is no and method 800 proceeds to 821.

At 821, method 800 activates the autonomous driver and commands the autonomous driver to move the vehicle to a surface (e.g., road) where the grade is sufficient to perform the fuel tank vent valve diagnostic. The autonomous driver moves the vehicle to a location where the grade is sufficient to perform the fuel tank vent valve diagnostic. The vehicle is moved by starting the engine and engaging the transmission into a forward or reverse gear. In one example, method 800 has the autonomous vehicle parked with its front end pointed downhill on the grade. Method 800 proceeds to 822.

At 822, method 800 stops the engine (e.g., ceases combustion within the engine and rotation of the engine). Method 800 proceeds to 823.

At 823, method 800 begins to monitor a temperature within the carbon filled canister. Additionally, the canister vent valve may be opened to allow fuel vapors to flow to the carbon filled canister. The temperature within the carbon canister may be indicative of the state of the fuel tank vent valves. For example, if the vehicle's front end is directed or pointing downhill such that the vehicle's front wheels are lower than the vehicle's rear wheels, then the fuel in the fuel tank may cause the first fuel tank vent valve (e.g., the fuel tank vent valve that is positioned closer to the vehicle's front wheels than to the vehicle's rear wheels) to close while the second fuel tank vent valve is open during conditions when the fuel tank vent valves are operating as expected. Fuel vapors may flow from the fuel tank to the carbon filled canister during such conditions via the second fuel tank vent valve. Method 800 proceeds to 824.

At 824, method 800 judges if the temperature in the carbon filled canister is increasing. An increasing temperature may be an indication that fuel vapors are presently being stored in the carbon filled canister. Storing fuel vapors may be indicative that the second fuel tank vent valve is open as expected. If method 800 judges that the temperature in the carbon filled canister is increasing, the answer is yes and method 800 proceeds to 825. Otherwise, the answer is no and method 800 proceeds to 826.

At 825, method 800 may judge that the second fuel tank vent valve or second grade vent valve (GVV2) is okay and operating as expected. Method 800 may indicate such a condition via a human/machine interface or to other computers on a network. Method 800 proceeds to 830.

At 826, method 800 judges if the temperature in the carbon filled canister is decreasing. A decreasing temperature may be an indication that liquid fuel has reached the carbon filled canister and cooled the canister. Such conditions may be present if the first vent valve does not close allowing fuel to flow to the carbon filled canister. If method 800 judges that the temperature in the carbon filled canister is decreasing, the answer is yes and method 800 proceeds to 827. Otherwise, the answer is no and method 800 proceeds to 828.

At 827, method 800 may judge that the first fuel tank vent valve or first grade vent valve (GVV1) is stuck open and not operating as expected. Method 800 may indicate that the first fuel tank vent valve is degraded via a human/machine interface or to other computers on a network. Method 800 proceeds to 830.

At 828, method 800 judges if a threshold amount of time (e.g., five minutes) has passed since the vehicle was most recently parked. If so, the answer is yes and method 800 proceeds to 829. Otherwise, the answer is no and method 800 returns to 824.

At 829, method 800 may judge that the second fuel tank vent valve or second grade vent valve (GVV2) is stuck closed since the temperature within the carbon canister has not increased as expected. Method 800 may indicate that the second fuel tank vent valve is degraded via a human/machine interface or to other computers on a network. Method 800 proceeds to 830.

At 830, method 800 activates the autonomous driver and commands the autonomous driver to move the vehicle to a surface (e.g., road) where the grade is sufficient to perform the second phase of the fuel tank vent valve diagnostic. By changing the vehicle's position, the area of the fuel tank that is occupied by fuel may be changed so as to make an effort to change a state of a fuel tank vent valve. The autonomous driver moves the vehicle to a location where the grade is sufficient to perform the second phase of the fuel tank vent valve diagnostic. The vehicle is moved by starting the engine and engaging the transmission into a forward or reverse gear. In one example, method 800 has the autonomous vehicle parked with its front end pointed uphill on the grade. Method 800 proceeds to 831.

At 831, method 800 stops the engine (e.g., ceases combustion within the engine and rotation of the engine). Method 800 proceeds to 832.

At 832, method 800 begins to monitor a temperature within the carbon filled canister. Additionally, the canister vent valve may be opened to allow fuel vapors to flow to the carbon filled canister. Method 800 proceeds to 833.

At 833, method 800 judges if the temperature in the carbon filled canister is increasing. An increasing temperature may be an indication that fuel vapors are presently being stored in the carbon filled canister. Storing fuel vapors may be indicative that the first fuel tank vent valve is open as expected. If method 800 judges that the temperature in the carbon filled canister is increasing, the answer is yes and method 800 proceeds to 834. Otherwise, the answer is no and method 800 proceeds to 835.

At 834, method 800 may judge that the first fuel tank vent valve or first grade vent valve (GVV1) is okay and operating as expected. Method 800 may indicate such a condition via a human/machine interface or to other computers on a network. Method 800 may also close the canister purge valve. Method 800 proceeds to 839.

At 835, method 800 judges if the temperature in the carbon filled canister is decreasing. A decreasing temperature may be an indication that liquid fuel has reached the carbon filled canister and cooled the canister. Such conditions may be present if the second vent valve does not close allowing fuel to flow to the carbon filled canister. If method 800 judges that the temperature in the carbon filled canister is decreasing, the answer is yes and method 800 proceeds to 836. Otherwise, the answer is no and method 800 proceeds to 837.

At 836, method 800 may judge that the second fuel tank vent valve or second grade vent valve (GVV2) is stuck open and not operating as expected. Method 800 may indicate that the second fuel tank vent valve is degraded via a human/machine interface or to other computers on a network. Method 800 may also close the canister purge valve. Method 800 proceeds to 839.

At 837, method 800 judges if a threshold amount of time (e.g., five minutes) has passed since the vehicle was most recently parked. If so, the answer is yes and method 800 proceeds to 838. Otherwise, the answer is no and method 800 returns to 833.

At 838, method 800 may judge that the first fuel tank vent valve or first grade vent valve (GVV1) is stuck closed since the temperature within the carbon canister has not increased as expected. Method 800 may indicate that the first fuel tank vent valve is degraded via a human/machine interface or to other computers on a network. Method 800 may also close the canister purge valve. Method 800 proceeds to 839.

At 839, method 800 adjusts vehicle operation if one or more fuel tank vent valves are determined to be degraded. In one example, method 800 may adjust a travel route of the vehicle to a destination such that the vehicle turns fewer times and/or stops and starts fewer times so that generation of fuel vapors may be reduced. If the vehicle is an autonomous vehicle, method 800 may reduce rates of vehicle speed changes to reduce fuel vapor generation. Additionally, method 800 may automatically schedule service for the vehicle at a service center. Method 800 proceeds to exit.

At 808, method 800 judges if the vehicle that includes the fuel tank vent valves has an adjustable suspension. In one example, a variable stored in controller memory may indicate if the vehicle has an adjustable suspension. For example, if the value of the variable is one the vehicle has an adjustable suspension. However, if the value of the variable is zero the vehicle does not have an adjustable suspension. If method 800 judges that the vehicle has an adjustable suspension, the answer is yes and method 800 proceeds to 840. Otherwise, the answer is no and method 800 proceeds to 810.

At 840, method 800 judges if the vehicle is parked on a surface (e.g., a road) with sufficient grade (e.g., greater than 3% or less than −3%) to perform a fuel tank vent valve diagnostic and if the front end of the vehicle is directed or pointing uphill or downhill (e.g., the front wheels are above or below the rear wheels). The grade and the amount of fuel may allow the controller to estimate what portion or area of the fuel tank is occupied with fuel and what section or area of the fuel tank is not occupied with fuel. Further, opening and closing of the vent valves may be inferred by estimating what portions or areas of the fuel tank are filled with fuel. In one example, fuel level and road grade or vehicle chassis angle may reference a table that outputs indications of which fuel tank vent valves are expected to be open and which fuel tank vent valves are expected to be closed. If method 800 judges that the vehicle is parked on a surface with sufficient grade to perform the fuel tank vent valve diagnostic, the answer is yes and method 800 proceeds to 842. If method 800 judges that the vehicle is not parked on a surface with sufficient grade to perform the fuel tank vent valve diagnostic, the answer is no and method 800 proceeds to 841. Alternatively, if a first and a second fuel tank vent valves are expected to be open, the answer is no and method 800 proceeds to 841.

At 841, method 800 increases a height of a rear suspension of the vehicle relative to the height of the vehicle's front suspension. By increasing the height of the rear suspension, fuel in the fuel tank may be biased toward closing the first fuel tank vent valve. Method 800 proceeds to 842.

At 842, method 800 begins to monitor a temperature within the carbon filled canister. Additionally, the canister vent valve may be opened to allow fuel vapors to flow to the carbon filled canister. The temperature within the carbon canister may be indicative of the state of the fuel tank vent valves. Fuel vapors may flow from the fuel tank to the carbon filled canister during conditions where the rear of the vehicle is elevated via the second fuel tank vent valve. Method 800 proceeds to 843.

At 843, method 800 judges if the temperature in the carbon filled canister is increasing. An increasing temperature may be an indication that fuel vapors are presently being stored in the carbon filled canister. Storing fuel vapors may be indicative that the second fuel tank vent valve is open as expected. If method 800 judges that the temperature in the carbon filled canister is increasing, the answer is yes and method 800 proceeds to 844. Otherwise, the answer is no and method 800 proceeds to 845.

At 844, method 800 may judge that the second fuel tank vent valve or second grade vent valve (GVV2) is okay and operating as expected. Method 800 may indicate such a condition via a human/machine interface or to other computers on a network. Method 800 proceeds to 850.

At 845, method 800 judges if the temperature in the carbon filled canister is decreasing. A decreasing temperature may be an indication that liquid fuel has reached the carbon filled canister and cooled the canister. Such conditions may be present if the first vent valve does not close allowing fuel to flow to the carbon filled canister. If method 800 judges that the temperature in the carbon filled canister is decreasing, the answer is yes and method 800 proceeds to 846. Otherwise, the answer is no and method 800 proceeds to 847.

At 846, method 800 may judge that the first fuel tank vent valve or first grade vent valve (GVV1) is stuck open and not operating as expected. Method 800 may indicate that the first fuel tank vent valve is degraded via a human/machine interface or to other computers on a network. Method 800 proceeds to 850.

At 847, method 800 judges if a threshold amount of time (e.g., five minutes) has passed since the vehicle was most recently parked. If so, the answer is yes and method 800 proceeds to 848. Otherwise, the answer is no and method 800 returns to 843.

At 848, method 800 may judge that the second fuel tank vent valve or second grade vent valve (GVV2) is stuck closed since the temperature within the carbon canister has not increased as expected. Method 800 may indicate that the second fuel tank vent valve is degraded via a human/machine interface or to other computers on a network. Method 800 proceeds to 850.

At 850, method 800 lowers the rear of the vehicle and raises the front of the vehicle via the adjustable suspension so that the front of the vehicle is higher than the rear of the vehicle, which is similar to pointing the vehicle's front end uphill. Consequently, the area of the fuel tank that is occupied by fuel may be changed. Method 800 proceeds to 851.

At 851, method 800 begins to monitor a temperature within the carbon filled canister. Additionally, the canister vent valve may be opened to allow fuel vapors to flow to the carbon filled canister. Method 800 proceeds to 852.

At 852, method 800 judges if the temperature in the carbon filled canister is increasing. An increasing temperature may be an indication that fuel vapors are presently being stored in the carbon filled canister. Storing fuel vapors may be indicative that the first fuel tank vent valve is open as expected. If method 800 judges that the temperature in the carbon filled canister is increasing, the answer is yes and method 800 proceeds to 853. Otherwise, the answer is no and method 800 proceeds to 854.

At 853, method 800 may judge that the first fuel tank vent valve or first grade vent valve (GVV1) is okay and operating as expected. Method 800 may indicate such a condition via a human/machine interface or to other computers on a network. Method 800 may also close the canister purge valve. Method 800 proceeds to 858.

At 854, method 800 judges if the temperature in the carbon filled canister is decreasing. A decreasing temperature may be an indication that liquid fuel has reached the carbon filled canister and cooled the canister. Such conditions may be present if the second vent valve does not close allowing fuel to flow to the carbon filled canister. If method 800 judges that the temperature in the carbon filled canister is decreasing, the answer is yes and method 800 proceeds to 855. Otherwise, the answer is no and method 800 proceeds to 856.

At 855, method 800 may judge that the second fuel tank vent valve or second grade vent valve (GVV2) is stuck open and not operating as expected. Method 800 may indicate that the second fuel tank vent valve is degraded via a human/machine interface or to other computers on a network. Method 800 may also close the canister purge valve. Method 800 proceeds to 858.

At 856, method 800 judges if a threshold amount of time (e.g., five minutes) has passed since the vehicle was most recently parked. If so, the answer is yes and method 800 proceeds to 857. Otherwise, the answer is no and method 800 returns to 852.

At 857, method 800 may judge that the first fuel tank vent valve or first grade vent valve (GVV1) is stuck closed since the temperature within the carbon canister has not increased as expected. Method 800 may indicate that the first fuel tank vent valve is degraded via a human/machine interface or to other computers on a network. Method 800 may also close the canister purge valve. Method 800 proceeds to 858.

At 858, method 800 adjusts vehicle operation if one or more fuel tank vent valves are determined to be degraded. In one example, method 800 may adjust a travel route of the vehicle to a destination such that the vehicle turns fewer times and/or stops and starts fewer times so that generation of fuel vapors may be reduced. If the vehicle is an autonomous vehicle, method 800 may reduce rates of vehicle speed changes to reduce fuel vapor generation. Additionally, method 800 may automatically schedule service for the vehicle at a service center. Method 800 proceeds to exit.

At 810, method 800 judges if the vehicle is parked on a surface (e.g., a road) with sufficient grade (e.g., greater than 3% or less than −3%) to perform a fuel tank vent valve diagnostic and if the front end of the vehicle is directed or pointing uphill or downhill (e.g., the front wheels are above or below the rear wheels). In one example, method 800 may determine the surface grade via a GPS system or an inclinometer. If method 800 judges that the vehicle is parked on a surface with sufficient grade to perform the fuel tank vent valve diagnostic, the answer is yes and method 800 proceeds to 860. Otherwise, the answer is no and method 800 proceeds to exit.

At 860, method 800 judges if the vehicle's front end is direct or pointing downhill such that the vehicle's front end is lower than the vehicle's rear end. If so, the answer is yes and method 800 proceeds to 861. Otherwise, the answer is no and method 800 proceeds to 870.

At 861, method 800 begins to monitor a temperature within the carbon filled canister. Additionally, the canister vent valve may be opened to allow fuel vapors to flow to the carbon filled canister. The temperature within the carbon canister may be indicative of the state of the fuel tank vent valves. Fuel vapors may flow from the fuel tank to the carbon filled canister during conditions where the rear of the vehicle is elevated via the second fuel tank vent valve. Method 800 proceeds to 862.

At 862, method 800 judges if the temperature in the carbon filled canister is increasing. An increasing temperature may be an indication that fuel vapors are presently being stored in the carbon filled canister. Storing fuel vapors may be indicative that the second fuel tank vent valve is open as expected. If method 800 judges that the temperature in the carbon filled canister is increasing, the answer is yes and method 800 proceeds to 863. Otherwise, the answer is no and method 800 proceeds to 864.

At 863, method 800 may judge that the second fuel tank vent valve or second grade vent valve (GVV2) is okay and operating as expected. Method 800 may indicate such a condition via a human/machine interface or to other computers on a network. Method 800 proceeds to 868.

At 864, method 800 judges if the temperature in the carbon filled canister is decreasing. A decreasing temperature may be an indication that liquid fuel has reached the carbon filled canister and cooled the canister. Such conditions may be present if the first vent valve does not close allowing fuel to flow to the carbon filled canister. If method 800 judges that the temperature in the carbon filled canister is decreasing, the answer is yes and method 800 proceeds to 865. Otherwise, the answer is no and method 800 proceeds to 866.

At 865, method 800 may judge that the first fuel tank vent valve or first grade vent valve (GVV1) is stuck open and not operating as expected. Method 800 may indicate that the first fuel tank vent valve is degraded via a human/machine interface or to other computers on a network. Method 800 proceeds to 868.

At 866, method 800 judges if a threshold amount of time (e.g., five minutes) has passed since the vehicle was most recently parked. If so, the answer is yes and method 800 proceeds to 867. Otherwise, the answer is no and method 800 returns to 862.

At 867, method 800 may judge that the second fuel tank vent valve or second grade vent valve (GVV2) is stuck closed since the temperature within the carbon canister has not increased as expected. Method 800 may indicate that the second fuel tank vent valve is degraded via a human/machine interface or to other computers on a network. Method 800 proceeds to 68.

At 868, method 800 adjusts vehicle operation if one or more fuel tank vent valves are determined to be degraded. In one example, method 800 may adjust a travel route of the vehicle to a destination such that the vehicle turns fewer times and/or stops and starts fewer times so that generation of fuel vapors may be reduced. If the vehicle is an autonomous vehicle, method 800 may reduce rates of vehicle speed changes to reduce fuel vapor generation. Additionally, method 800 may automatically schedule service for the vehicle at a service center. Method 800 proceeds to exit.

At 870, method 800 begins to monitor a temperature within the carbon filled canister. Additionally, the canister vent valve may be opened to allow fuel vapors to flow to the carbon filled canister. Method 800 proceeds to 872.

At 872, method 800 judges if the temperature in the carbon filled canister is increasing. An increasing temperature may be an indication that fuel vapors are presently being stored in the carbon filled canister. Storing fuel vapors may be indicative that the first fuel tank vent valve is open as expected. If method 800 judges that the temperature in the carbon filled canister is increasing, the answer is yes and method 800 proceeds to 873. Otherwise, the answer is no and method 800 proceeds to 874.

At 873, method 800 may judge that the first fuel tank vent valve or first grade vent valve (GVV1) is okay and operating as expected. Method 800 may indicate such a condition via a human/machine interface or to other computers on a network. Method 800 may also close the canister purge valve. Method 800 proceeds to 878.

At 874, method 800 judges if the temperature in the carbon filled canister is decreasing. A decreasing temperature may be an indication that liquid fuel has reached the carbon filled canister and cooled the canister. Such conditions may be present if the second vent valve does not close allowing fuel to flow to the carbon filled canister. If method 800 judges that the temperature in the carbon filled canister is decreasing, the answer is yes and method 800 proceeds to 875. Otherwise, the answer is no and method 800 proceeds to 876.

At 875, method 800 may judge that the second fuel tank vent valve or second grade vent valve (GVV2) is stuck open and not operating as expected. Method 800 may indicate that the second fuel tank vent valve is degraded via a human/machine interface or to other computers on a network. Method 800 may also close the canister purge valve. Method 800 proceeds to 878.

At 876, method 800 judges if a threshold amount of time (e.g., five minutes) has passed since the vehicle was most recently parked. If so, the answer is yes and method 800 proceeds to 877. Otherwise, the answer is no and method 800 returns to 872.

At 877, method 800 may judge that the first fuel tank vent valve or first grade vent valve (GVV1) is stuck closed since the temperature within the carbon canister has not increased as expected. Method 800 may indicate that the first fuel tank vent valve is degraded via a human/machine interface or to other computers on a network. Method 800 may also close the canister purge valve. Method 800 proceeds to 878.

At 878, method 800 adjusts vehicle operation if one or more fuel tank vent valves are determined to be degraded. In one example, method 800 may adjust a travel route of the vehicle to a destination such that the vehicle turns fewer times and/or stops and starts fewer times so that generation of fuel vapors may be reduced. If the vehicle is an autonomous vehicle, method 800 may reduce rates of vehicle speed changes to reduce fuel vapor generation. Additionally, method 800 may automatically schedule service for the vehicle at a service center. Method 800 proceeds to exit.

In this way, diagnostics may be performed for fuel tank vent valves that are passively operated. The diagnostics may include automatically moving the vehicle or adjusting the vehicle's suspension system to facilitate state changes in the vent valves.

Thus, method 800 provides for a method for diagnosing an evaporative emissions system, comprising: adjusting a position of a vehicle from a first position to a second position via a controller in response to an area of a fuel tank that is occupied via a fuel, or in another representation, in response to a request to diagnose fuel tank vent valve operation; and evaluating operation of a fuel tank vent valve while the vehicle is in the second position. The method includes where adjusting the position of the vehicle includes moving the vehicle to a parking surface having a magnitude of grade that is greater than a threshold. The method includes where the vehicle is moved via an autonomous driver. The method includes where adjusting the position of the vehicle includes adjusting a suspension of the vehicle. The method includes where evaluating operation of the fuel tank vent valve includes monitoring a temperature within a carbon housing canister.

In some examples, the method further comprises adjusting the position of the vehicle from the second position to a third position in response to completing diagnosing the fuel tank vent valve and beginning diagnosing a second fuel tank vent valve. The method includes where the first position is a level surface and the second position is a surface with a grade greater than a threshold. The method further comprises adjusting a travel route of the vehicle in response to the evaluation of the fuel tank vent valve.

Method 800 also provides for a method for diagnosing an evaporative emissions system, comprising: parking a vehicle on a first surface having a magnitude of a grade that is greater than a threshold via an autonomous vehicle controller; and evaluating operation of a first fuel tank vent valve while the vehicle is parked on the first surface. The method further comprises parking the vehicle on a second surface via the autonomous vehicle controller and evaluating operation of a second fuel tank vent valve while the vehicle is parked on the second surface. The method includes where evaluating operation of the first fuel tank vent valve includes monitoring a temperature of a carbon filled canister. The method further comprises indicating degradation of the first fuel tank vent valve in response to the temperature not increasing while the vehicle is parked on the first surface. The method further comprises indicating degradation of a second fuel tank vent valve in response to the temperature decreasing while the vehicle is parked on the first surface.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
  a vehicle including an internal combustion engine and a fuel tank, the fuel tank including at least one vent valve; and
  one or more controllers in the vehicle, the one or more controllers including executable instructions stored in non-transitory memory that cause the one or more controllers to evaluate operation of a vent valve in response to an area in a fuel tank that is occupied by a fuel, and to determine an operating state of the vent valve in response to a temperature of a carbon filled canister.

2. The vehicle system of claim 1, where the area of the fuel tank is inferred from an inclination of the vehicle and a fuel level sensor.

3. The vehicle system of claim 1, further comprising additional instructions to change a position of the vehicle to change the area in the fuel tank that is occupied by the fuel.

4. The vehicle system of claim 3, where changing the position of the vehicle includes stopping the vehicle on a surface having a grade with a magnitude that is greater than a threshold.

5. The vehicle system of claim 1, further comprising additional instructions to indicate that the vent valve is degraded or not degraded according to the operating state.

6. A vehicle system, comprising:
   a vehicle including an internal combustion engine and a fuel tank, the fuel tank including at least one vent valve; and
   one or more controllers in the vehicle, the one or more controllers including executable instructions stored in non-transitory memory that cause the one or more controllers to evaluate operation of a vent valve in response to an area in a fuel tank that is occupied by a fuel, and additional instructions to adjust a travel route of the vehicle in response to whether or not the vent valve is degraded.

7. A method for diagnosing an evaporative emissions system, comprising:
   adjusting a position of a vehicle from a first position to a second position via a controller in response to an area of a fuel tank that is occupied via a fuel; and
   evaluating operation of a fuel tank vent valve while the vehicle is in the second position.

8. The method of claim 7, where adjusting the position of the vehicle includes moving the vehicle to a parking surface having a magnitude of grade that is greater than a threshold.

9. The method of claim 8, where the vehicle is moved via an autonomous driver.

10. The method of claim 7, where adjusting the position of the vehicle includes adjusting a suspension of the vehicle.

11. The method of claim 7, where evaluating operation of the fuel tank vent valve includes monitoring a temperature within a carbon housing canister.

12. The method of claim 7, further comprising adjusting the position of the vehicle from the second position to a third position in response to completing diagnosing the fuel tank vent valve and beginning diagnosing a second fuel tank vent valve.

13. The method of claim 7, where the first position is a level surface and the second position is a surface with a grade greater than a threshold.

14. The method of claim 7, further comprising adjusting a travel route of the vehicle in response to the evaluation of the fuel tank vent valve.

15. A method for diagnosing an evaporative emissions system, comprising:
   parking a vehicle on a first surface having a magnitude of a grade that is greater than a threshold via an autonomous vehicle controller; and
   evaluating operation of a first fuel tank vent valve while the vehicle is parked on the first surface.

16. The method of claim 15, further comprising parking the vehicle on a second surface via the autonomous vehicle controller and evaluating operation of a second fuel tank vent valve while the vehicle is parked on the second surface.

17. The method of claim 15, where evaluating operation of the first fuel tank vent valve includes monitoring a temperature of a carbon filled canister.

18. The method of claim 17, further comprising indicating degradation of the first fuel tank vent valve in response to the temperature not increasing while the vehicle is parked on the first surface.

19. The method of claim 17, further comprising indicating degradation of a second fuel tank vent valve in response to the temperature decreasing while the vehicle is parked on the first surface.

* * * * *